United States Patent [19]

Gegner

[11] Patent Number: 5,594,635
[45] Date of Patent: **\*Jan. 14, 1997**

[54] CONSTANT FREQUENCY, ZERO-VOLTAGE-SWITCHING CONVERTERS WITH RESONANT SWITCHING BRIDGE

[75] Inventor: Joel P. Gegner, Oak Park, Ill.

[73] Assignee: Motorola, Inc., Schaumburg, Ill.

[ * ] Notice: The term of this patent shall not extend beyond the expiration date of Pat. No. 5,532,919.

[21] Appl. No.: 40,302

[22] Filed: Mar. 30, 1993

[51] Int. Cl.⁶ .................................................. H02M 3/10
[52] U.S. Cl. ............................................. 363/124; 363/132
[58] Field of Search .............................. 363/17, 98, 132, 363/124

[56] References Cited

U.S. PATENT DOCUMENTS

| | | | |
|---|---|---|---|
| 4,504,895 | 3/1985 | Steigerwald | 363/17 |
| 4,720,667 | 1/1988 | Lee et al. | 323/271 |
| 4,720,668 | 1/1988 | Lee et al. | 323/271 |
| 4,841,220 | 6/1989 | Tabisz et al. | 323/282 |
| 4,855,888 | 8/1989 | Henze et al. | 363/17 |
| 4,857,822 | 8/1989 | Tabisz et al. | 323/282 |
| 4,860,184 | 8/1989 | Tabisz et al. | 363/17 |
| 4,876,635 | 10/1989 | Parrk et al. | 363/17 |
| 4,931,716 | 6/1990 | Jovanovic et al. | 323/222 |
| 4,953,068 | 8/1990 | Henze | 363/17 |
| 5,132,888 | 7/1992 | Lo et al. | 363/17 |
| 5,132,889 | 7/1992 | Hitchcock et al. | 363/17 |
| 5,157,593 | 10/1992 | Jain | 363/17 |
| 5,235,501 | 8/1993 | Stuart et al. | 363/17 |
| 5,532,919 | 7/1996 | Gegner | 363/124 |

OTHER PUBLICATIONS

K. Liu and F. C. Lee, "Resonant switches—a unified approach to improve performances of switching converters," in *IEEE International Telecommunications Energy Conf. Proc.*, May 1984, pp. 334–341.

K. H. Liu and F. C. Lee, "Zero–Voltage Switching Technique in DC/DC Converters," *IEEE Trans. On Power Electronics*, vol. 5, No. 3, Jul. 1990, pp. 293–304.

O. D. Patterson, D. M. Divan, "Pseudo–Resonant Full–Bridge DC–DC Converter," *IEEE Power Electronics Specialists Conf. Rec.*, Jun. 1987, pp. 424–430.

C. Q. Lee, S. Sooksatra, and Henry Lee, "Performance Characteristics of The Full–Bridge Zero–Voltage Switching PWM Resonant Converter," *IEEE Transactions On Industrial Electronics*, Dec. 1991, pp. 462–468.

(List continued on next page.)

*Primary Examiner*—Jeffrey L. Sterrett

[57] ABSTRACT

A novel, compact, converter structure utilizes a switching bridge configuration to provide a low voltage stress, constant frequency controlled converter whose switches and diodes all turn-on and turn-off with zero-voltage-switching. The novel converter configuration uses a full-bridge switching circuit comprising four diodes $D_1$–$D_4$ and, in one embodiment, four active semiconductor switches $S_1$–$S_4$. A resonant inductor $L_r$ is connected across the bridge nodes a and b, and parasitic capacitance of the diodes and active switches $S_1$–$S_4$ are incorporated in an L-C circuit. Connected in parallel with the bridge is a voltage source or sink, depending on the direction that power will flow; and connected to node a or b is a current source or sink, again depending upon the direction of power flow. The present invention stores sufficient energy in the resonant inductor $L_r$ so that prior to each switch or diode commutation, charge present on the corresponding parasitic capacitance of that semiconductor may be removed by the current drawing action of the resonant inductor $L_r$. In this way, all diodes $D_1$–$D_4$ and active switches $S_1$–$S_4$ operate with zero-voltage-switching. The novel bridge configuration directs the power flow from the source to the load, while passively guaranteeing voltage limitation across each diode and switch, and providing volts-seconds balance for the resonant inductor $L_r$.

6 Claims, 16 Drawing Sheets

OTHER PUBLICATIONS

I Barbi, D. C. Martins, R. Prado, "Effects of Non-linear Resonant Inductor on the Behavior of ZVS Quasi-Resonant Converters," *IEEE Power Electronics Specialists Conf. Rec.*, Aug. 1990, pp. 522–527.

Vorperian, "Quasi-Square Wave Converters: Topologies and Analysis," *IEEE Trans. on Power Electronics*, vol. 3, No. 2, Apr. 1988, pp. 183–191.

Dragan Maksimovic, and Slobodan Cuk, "Constant Frequency Control of Quasi-Resonant Converters," *IEEE Trans. on Power Electronics*, vol. 6, No. 1, Jan. 1991, pp. 141–150.

G. Hua, C. S. Leu, and F. C. Lee, "Novel Zero-Voltage-Transition PWM Converters," *IEEE Power Electronics Specialists Conf. Rec.*, Mar. 1992, pp. 55–61.

K. W. E. Cheng, and P. D. Evans, "Parallel-Mode Extented-Period Quasi-Resonant Convertor," *IEE Proc. on Electric Power Applications*, Sep. 1991, pp. 243–251.

G. Hua, and F. C. Lee, "A New Class of Zero-Voltage Switched PWM Converters," *IEEE High Frequency Power Conversion Cong. Rec.*, Jun. 1991, pp. 244–251.

I. Barbi, J. C. Bolacell, D. C. Martins, and F. B. Libano, "Buck Quasi-Resonant Converter Operating at Constant Frequency: Analysis, Design, and Experimentation," *IEEE Power Electronics Specialists Conf. Rec.*, Jul. 1990, pp. 276–283.

Richard Farrington, Milan M. Jovanovic, and Fred C. Lee, "Constant-Frequency Zero-Voltage-Switched Multi-Resonant Converters: Analysis, Design, and Experimental Results," *IEEE Power Electronics Specialists Conf. Rec.*, Aug. 1990, pp. 197–205.

G. Hua, C. S. Leu, and F. C. Lee, "Novel Zero-Voltage-Transition PWM Converters," *VPEC Seminar Rec.*, Dec. 1991, pp. 81–88.

Dong Y. Huh, Hack S. Kim, and Gyu H. Cho, "New Group of ZVS PWM Converters Operable on Constant Frequency and Its Application to Power Factor Correction Circuit," *IEEE Power Electronics Specialists Conf. Rec.*, Mar. 1992, pp. 1441–1446.

Kim, Leu, Farrington, and Lee; "Clamp Mode Zero Voltage Switched Multi-Resonant Converters", IEEE Mar. 1992; pp. 78–84.

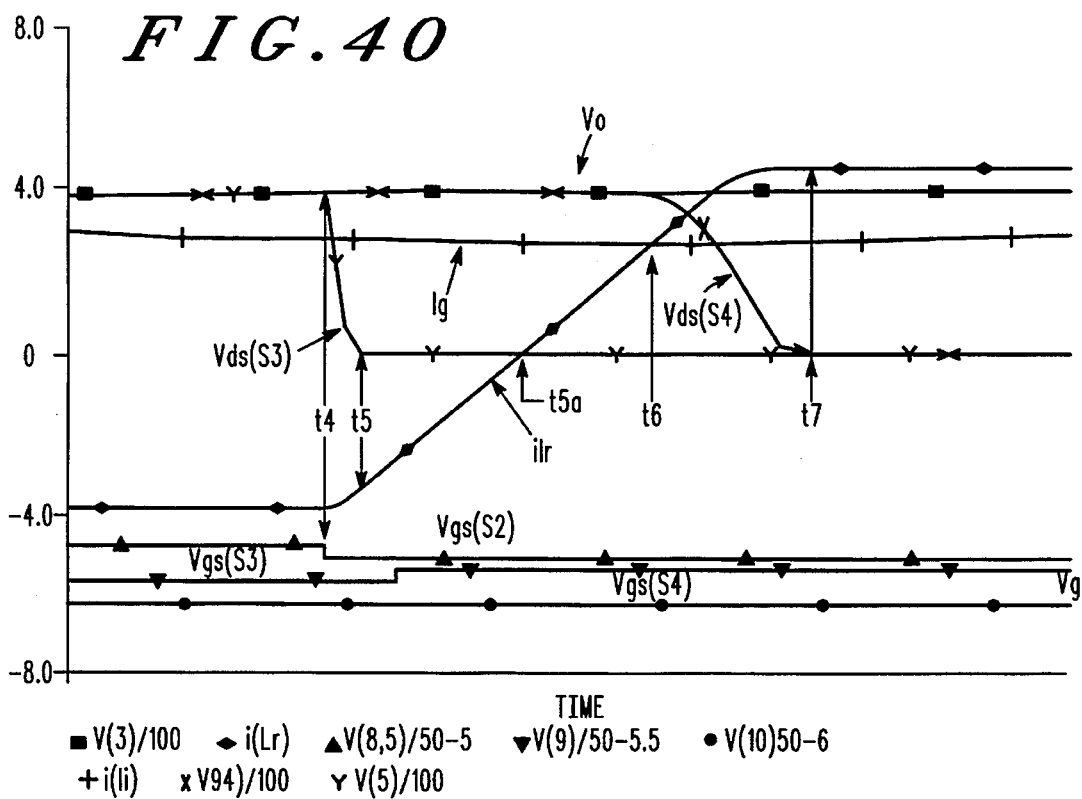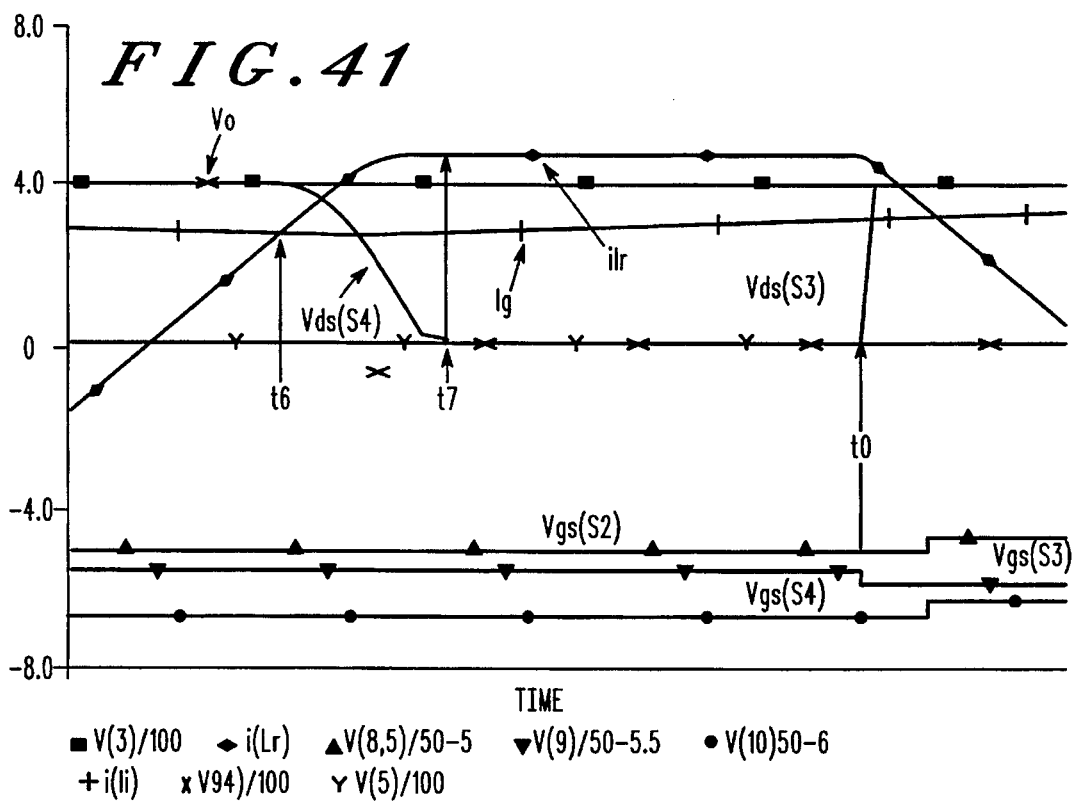

CONSTANT FREQUENCY, ZERO-VOLTAGE-SWITCHING CONVERTERS WITH RESONANT SWITCHING BRIDGE

FIELD OF THE INVENTION

This invention relates generally to switching power converters and more particularly to providing an improved soft switching apparatus for use therewith.

BACKGROUND OF THE INVENTION

Switching Power Converters have for many years served as a viable means for electrical energy conversion. Unfortunately, although the semiconductor devices used in these converters are operated in a manner similar to that of switches, undesirable energy dissipation internal to these conventional devices nevertheless occurs during turn-on and turn-off transitions. Such losses are due to the simultaneous existence of voltage across and current through the semiconductor devices during commutation. Because these losses occur at each switch transition, high frequency operation correspondingly yields low power conversion efficiencies.

Since higher switching frequencies generally result in smaller reactive components and improved dynamic performance, mechanisms for minimizing switching losses have long been sought after. For example, in conventional Pulse-Width-Modulated (PWM) switch-mode converters, energy recovery snubbers have been used to "soften" the switching of semiconductor devices. A technique known as "soft-switching" has been implemented in switching power converters. This conventional technique seeks to eliminate switching losses by altering the switching conditions in such a way that the switch current or switch voltage is zero at the time of commutation.

In this way "Zero-Current-Switching" (ZCS) or "Zero-Voltage-Switching" (ZVS) respectively, is attempted. To implement this switching mechanism, an L-C network is added around the switch so that the switch current or switch voltage may be kept at a constant zero value during switch commutation. Conventional switch-mode converters using this type of soft-switch are known as Quasi-Resonant Converters (QRC).

ZCS may be attempted when an inductor is placed in series with the semiconductor switch (FIG. 1). Since the energy stored in an inductor cannot change instantaneously, neither can the current through it change instantaneously. If energy resonates between the inductor and the capacitor when the switch is on, then the switch may be opened losslessly (in theory) at a time when the inductor has dumped all of its energy to the capacitor. Once the switch is open, the inductor current remains zero, and the switch can turn on with zero-current through it.

ZVS may be attempted when a capacitor is placed in parallel with the semiconductor switch (FIGS. 2 and 3). Since energy stored in the capacitor cannot change instantaneously, neither can the voltage across it change instantaneously. If energy resonates between the capacitor and the inductor when the switch is off, then the switch may be closed losslessly (in theory) at a time when the capacitor has dumped all of its energy to the inductor. Once the switch is closed, the capacitor is shorted and its voltage remains zero, thus allowing zero-voltage-turn-off for the switch.

Both ZVS and ZCS conventional techniques seek to decrease switching losses and attempt to permit high efficiency operation at higher switching frequencies. However, only ZVS is effective in reducing switching losses at high frequencies, because some loss occurs during turn-on of a ZCS switch. Parasitic capacitance across the semiconductor switch stores energy while the switch is off, and releases it internally when the switch is turned on. For this reason, high frequency operation of such conventional converters, even with the attendant switching losses, is possible only with ZVS converters.

In practice, ZCS techniques have often been used in place of ZVS techniques even though switching losses are not altogether eliminated (e.g. ZCS Boost QRC of FIG. 7), because with ZVS converters, the large resonant voltage of the resonant capacitor is imposed across the active switch. In some half and full-bridge converter topologies, this resonant voltage is limited by the clamping action of the input voltage source. In known single-ended converter topologies, such as the ZVS Boost QRC of FIG. 8, the voltage is unrestrained and may peak at a value equal to ten times or more the input or output voltage. This peak resonant voltage is also a strong function of the output load resistance or current. Therefor, at high voltage and/or high power levels, the voltage stresses impressed upon the active switch are intolerable, thus making ZVS implementation in single-ended converters impractical.

Several techniques have attempted to reduce these high voltage levels in the hopes of making ZVS a viable technique for high voltage and/or high power applications. One such technique known as ZV Multi-Resonant Switching (ZVS-MR) reduces voltage stresses by adding a second resonant capacitor across the rectifying diode(s) of the power converter. Two resonant capacitors are provided, one across the active switch(es), and the other across the rectifier diode(s) which share the energy resonating from the resonant inductor. In this way, the peak voltage across the active switch is reduced since the high voltage is divided between the two resonant capacitors. A typical conventional ZVS-MR Boost Converter is shown in FIG. 9. Unfortunately, this technique does not eliminate these stresses, particularly so for off-line applications where input voltages may be as high as several hundred volts.

Another technique incorporating the above mentioned multi-resonant technique has also been used to decrease the voltage stresses on the active switch. This technique utilizes the above mentioned two capacitor multi-resonant circuit to include a voltage clamping mechanism to limit the active switch voltage. This technique implemented in a Boost converter is shown in FIG. 10. The voltage clamp includes a bulk capacitor and an auxiliary switch. Since the bulk capacitor is large relative to the resonant capacitors, the voltage across it can be approximately constant over a switching cycle. When the voltage on the active switch is equal to that of the bulk capacitor, the auxiliary switch turns on with ZVS and energy flowing from the resonant inductor is routed from the resonant capacitor to the bulk capacitor.

The auxiliary switch turns back off once the amount of charge in the bulk capacitor has flowed back out. In this way no net charge accumulates on the bulk capacitor from one cycle to the next and its voltage remains essentially constant. This technique lowers peak voltage stresses, but circuit complexity is increased, and reliability is correspondingly decreased since failure of the active voltage clamping circuit would cause voltage breakdown in the main active switch and consequent failure of the power supply itself.

One type of conventional converter which has successfully addressed low voltage stress operation for all active and passive semiconductor devices is known as the Quasi-Square Wave (QSW) Converter (FIG. 11). This converter modifies the switch-mode single-ended converters by placing a resonant capacitor across the active switch and/or the passive switch (diode); the filtering inductor is replaced by a small resonant inductor. A diode is added in parallel with the active switch, and a second active switch is sometimes added across the rectifying diode (FIG. 11). In doing so, all semiconductor switches operate with near ZVS, and their peak voltage is passively limited (by the diodes in the circuit) to whatever voltage sources and sinks are present in the circuit. For example, in a Boost converter, the input filter inductor is replaced by a resonant inductor, and the voltage stress on the switches is equal to the output voltage. Unfortunately, rms currents in the resonant inductor are unacceptably high, and an essentially constant resonant inductor current is impossible. In effect, a QSW Boost converter is no longer driven by an effective current source, but rather a voltage source.

In a quasi-square wave boost converter, the voltage stress of the active switch and passive switch is limited to the output voltage since these switches along with the output filter capacitor form a closed loop. In other words, the sum of the two switch voltages equals the output voltage. The two diodes in the circuit will passively turn-on when the voltage on either switch reaches the output voltage. To conserve the original operation of the Boost converter, the input inductor must be restored to a filter inductor (so that input current may be continuous and nearly constant if desired,) and the resonant inductor must be moved to a new location in the circuit.

For ZVS operation of the switches a resonant inductor is needed to remove the charge stored within the parasitic capacitances of each switch. By adding an auxiliary switch and diode, a zero-voltage-transition (ZVT) converter circuit of FIG. 12 is known. The ZVT converter achieves ZVS operation for the main power switch S and power rectifier $D_R$, however, the auxiliary switch and diode operate with ZCS. Although the main power flow is not directed through these devices, nevertheless losses can be unacceptably significant since the voltage across the devices may be as high as 400 Volts in universal input off-line applications. This lossy switching results in the inability to operate at very high frequencies.

Therefor, single-ended switching power converters possessing exclusively ZVS operated semiconductor devices, along with low voltage stresses have not been forthcoming. A ZVS-MR converter with an auxiliary active voltage clamping mechanism is not reliable since the clamping is not passive but active, and added complexity is also required for controlling its auxiliary clamping switch. Quasi-square wave converters possess an inherent passive voltage clamping mechanism, however the basic operation of these converters have been altered from that of their switch-mode counterparts. Input or output filter inductors have been replaced by small resonant inductors causing high rms currents. By relocating the resonant inductor and adding an auxiliary active switch and diode, the ZVT converter provides desired ZVS switching for the power switch and power rectifier, but operates the auxiliary active switch and diode with ZCS. This yields significant turn-on losses at high frequencies.

Low loss switching techniques are desirable for improving converter efficiencies, however implementing these conventional schemes have been problematical. For example, ZVS techniques usually result in high voltage stresses in single-ended converters. Another problem concerns the means by which output voltage or current regulation is accomplished. In conventional Switch-Mode converters, regulation is achieved by varying the switch duty cycle while maintaining the switching frequency constant. In conventional soft-switching converters, the control law for regulating output voltage or current has inadvertently changed from a constant frequency to a variable frequency control scheme. This is an undesirable control method, making line filter designs more difficult as well as adversely affecting electromagnetic interference. Therefore, methods for maintaining constant frequency control, along with soft-switching, have been sought after.

There is a fundamental reason why conventional quasi-resonant converters must operate with a variable frequency control law: In the case of ZCS, the switch may turn on at any time with zero current turn-on, but the turn-off of the switch is determined by the resonant inductor current. In the case of a bidirectional switch, the turn-off must occur when the resonant inductor causes current to flow through the switch parallel diode. As a result, the on-time of the switch is determined by the resonant L-C circuit as well as the operating point (i.e. input and output voltage and current). If the effective duty cycle is to be changed, it must occur by changing the switching period rather than the on-time. In the case of ZVS, the switch may turn off at any time with zero-voltage turn-off, but the turn-on of the switch is determined by the resonant capacitor voltage. For a uni-polar switch, the turn-on must occur when the resonant capacitor causes the voltage across the switch to go to zero and thus turn on the parallel diode. Therefor, the off-time of the switch is not controllable, thereby forcing the switching period to become the controlled variable for achieving voltage regulation.

By implementing such soft-switching, freedom in control is lost. In conventional switch-mode converters, both the on-time and the off-time of the switch is controllable, but with soft-switching, either the on-time (ZCS) or the off-time (ZVS) is no longer arbitrarily controlled. To achieve soft-switching along with constant frequency control, freedom of control must be re-established.

Many topologies are known which seek to implement soft-switching and restore constant-frequency control. These conventional implementations use at least two active switching devices operating with either ZCS or ZVS. One such family of constant frequency controlled converters have been referred to as Extended Period Quasi-Resonant Converters, because the resonant cycle between $L_r$ and $C_r$ which is present in all QRC's, is temporarily interrupted by the opening or closing of an auxiliary switch. The equivalent on-time (for ZCS) or off-time (for ZVS) of the switch is determined by the L-C components as well as the input and output voltages and currents. This on-time or off-time is not a controllable parameter, and as a result the output is controlled only by varying the switching frequency. By interrupting the resonant cycle, the equivalent on-time or off-time may be extended for an arbitrary amount of time. In this way, freedom to control both on-time and off-time is restored, and constant frequency operation is made possible.

Extended period quasi-resonant converters (QRC's) are either: parallel mode, or series mode. In parallel mode extended period QRC's, the auxiliary switch which interrupts the resonant cycle is in parallel with one of the resonant components and commutes with ZVS. Two such Boost converters are depicted in FIG. 13 and 14. In series mode extended period QRC's, the auxiliary switch is in series with one of the resonant components, and commutes with ZCS (FIG. 15). Extended period QRC's may be implemented in both ZCS and ZVS conventional QRC's. As a result, one switch might operate with ZVS, while the other operates with ZCS, or vice versa, or both switches may be operated with ZCS or ZVS.

Extended period quasi-resonant converters exhibit constant frequency control while maintaining soft-switching on all switches. However, limitations in load and line regulation are similar to those of conventional QRC's. It is well established that QRC's operated in a full-wave mode exhibit significantly improved load regulation over QRC's operated in a half-wave mode. Similarly, extended period quasi-resonant converters operating in a full-wave mode exhibit far superior load regulation over similar converters operated in a half-wave mode. In extended mode QRC's, several problems make ZVS operation impractical.

First, although full-wave mode operation is desirable for good load regulation, it is undesirable for true ZVS: parasitic capacitance across the active power switch retains charge trapped when the series diode turns off which yield unacceptable turn-on loss similar to the loss in ZCS. Secondly, high voltage stresses present across the switches make such converters impractical. Therefor, although conventional extended mode QRC's can provide constant frequency operation, practical ZVS implementations which are applicable in high power or high voltage systems are not forthcoming. The ZCS extended mode QRC's however, do provide advantages in terms of voltage stresses and load regulation. When operated in a full-wave mode, load and line regulation is comparable to their Switch-Mode counterparts.

Unfortunately, at higher power levels, dv/dt across the switch becomes very large causing unacceptable voltage overshoot, as well as high frequency oscillation between the resonant inductor and parasitic switch capacitance. Passive or active snubbers may alleviate this problem, only to lead to either loss of efficiency or added complexity, or both.

Another conventional method of producing soft-switching constant frequency controlled single-ended converters modifies a variable frequency controlled ZVS-MR converter as shown in U.S. Pat. Nos. 4,841,220, 4,857,822, and 4,860,184. By adding an active switch across the passive rectifier diode, power flow to the load is controlled via constant frequency control. Such a Boost converter is shown in FIG. 16. Two control methods are known. The first method uses a primary switch to maintain a constant energy storage level in the resonant inductor at the beginning of each switching cycle. The active rectifier switch controls the portion of time during a switching cycle that the L-C tank is connected to the load and supplying power to it. This technique can allow very high frequency operation. Unfortunately, high voltage stresses make these conventional converters impractical for high voltage and/or high power applications.

The second method of control, as shown in U.S. Pat. No. 4,931,716, utilizes an active rectifier switch to control the direction of power flow between the L-C tank and the load. By leaving this switch on longer, more power returns to the tank after having flowed to the load. By leaving the switch on a shorter period of time, less power returns and thus a higher output voltage is obtained for a given output load. This converter and its control technique suffer from both high voltage stresses, and higher rms currents, since bi-directional power to and from the load occur.

As mentioned previously, Quasi-Square Wave converters are known that address the detrimental high voltage stress of single-ended ZVS converters. These converters replace the filtering inductor of the converter with a small resonant inductor. In addition to providing low switch voltage stresses, these converters can approach constant frequency control. When an active switch is added across the rectifying diode, power flow from the source to the resonant inductor at the beginning of the switching cycle may be controlled arbitrarily, and power flow between the resonant inductor and the output load may also be controlled arbitrarily.

However, one problem with this approach is that all currents in the converter have large rms values since the energy storage level in the resonant inductor must cross zero during each switching cycle. Although these known converters physically resemble their switch-mode counterparts, they nevertheless operate very differently. The Boost converter, for instance, may no longer be designed to operate with a near constant input current. Naturally, there exists a non-zero average DC current, however, high harmonics and high rms values make high power factor and high efficiency difficult at medium to high power levels.

A Switch Module is known which provides ZCS turn-on and ZVS turn-off as the active switch of an switch-mode converter. This switch module includes two active (semiconductor) switches, four diodes (only two if two MOSFETS are used as active switches,) and a resonant inductor and resonant capacitor. In a Boost converter implementation, this circuit appears as in FIG. 17. The four diodes clamp the switches' voltage to whatever voltage sources are in the circuit (e.g. $V_{in}$ for the Buck converter), and the two active switches operate off of the same driving waveform. In principle, this converter may be used at high voltage and high power levels, however ZCS turn-on losses and conduction losses are severe at higher power levels because the input current has to flow through both active switches as well as the resonant inductor during the converter's equivalent on-state.

Several Zero-Voltage-Transition (ZVT) Switching techniques have been used in single-ended switch-mode converters (Boost converter circuits shown in FIGS. 12 and 18) quasi-square wave converters are a type of ZVT converter, since the rate of change of voltage across the active switch and rectifier are equal because the voltage across these sums to a constant voltage. For example, in a Boost converter, the voltage across the active switch, plus the voltage across the rectifier, equals the output voltage. In conventional ZVS QRC's, a separate resonant capacitor is required across the rectifier to produce the ZVS MR QRC's to eliminate unwanted oscillations between the rectifier parasitic capacitance and the resonant inductor.

One should note that the basic principle in ZVT converters is to attempt to provide a resonant inductor which can store sufficient energy such that current flowing through it can—at the desired time—remove the charge stored in the parasitic capacitance of the active switch prior to its commutation to the on state.

Unfortunately, known methods require the addition of an auxiliary switch which operates with ZCS. This auxiliary switch is turned on with ZCS to initiate the removal of charge stored in the parasitic capacitances. One of ordinary skill hopes that switching losses in the auxiliary switch will not be severe since a relatively small portion of average energy flows through it over a switching period. At medium frequencies, the converter operates efficiently, but at frequencies near 1 MHz, turn-on loss are unacceptably significant (25 Watt for $V_{ds}$=400 V and $C_{ds}$=300 pF). As mentioned previously, unwanted oscillations are always present with known ZCS techniques. These unwanted oscillations worsen at higher switching frequencies and further deteriorate conventional converter performance.

SUMMARY OF THE INVENTION

The present invention is directed to a novel, compact, converter structure that utilizes a switching bridge configuration to provide a low voltage stress, constant frequency controlled converter whose switches and diodes all turn-on and turn-off with zero-voltage-switching.

DESCRIPTION OF DRAWINGS

FIGS. 38–41 depicts simulated waveforms of the Converter of FIG. 20 with time intervals shown.

DETAILED DESCRIPTION OF THE PREFERRED EMBODIMENT

Figure 19:
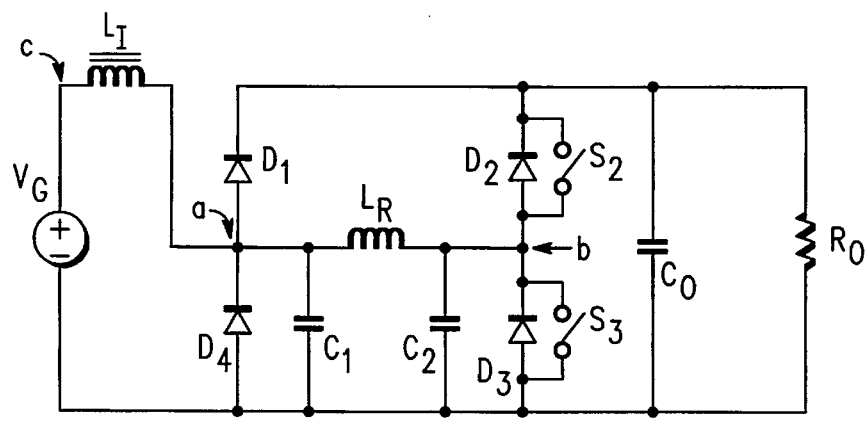
FIGS. 19–21 are schematic diagrams of ZVS Constant Frequency Boost With Resonant Bridge Configuration as set forth by the present invention.
Figure 20:
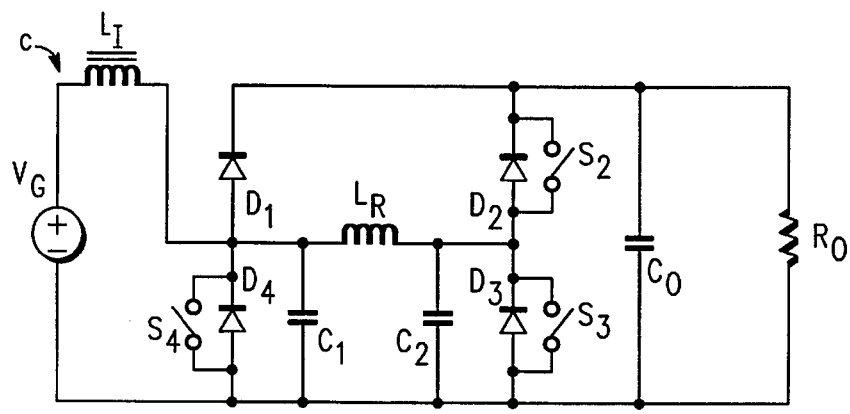
Figure 21:
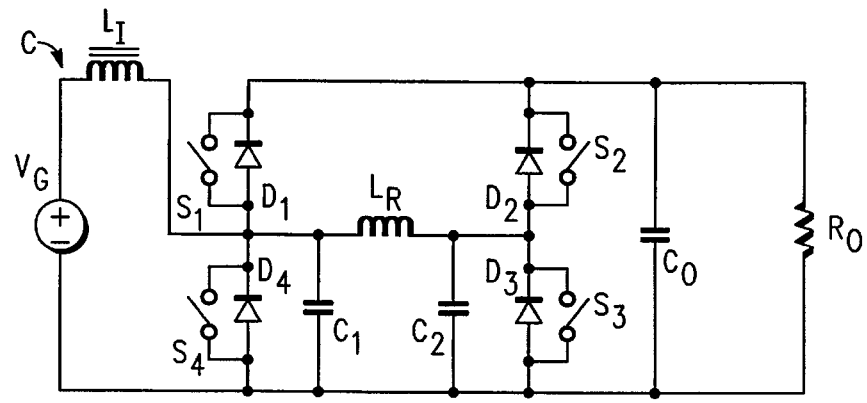

Implementations of this novel switching apparatus utilized in a Boost converter, are shown in FIGS. 19–21. In FIG. 19, one active auxiliary switch has been added, in FIG. 20, two auxiliary switches are used, and FIG. 21 shows the novel Boost converter with three auxiliary active switches, as will now be described.

Figure 22:
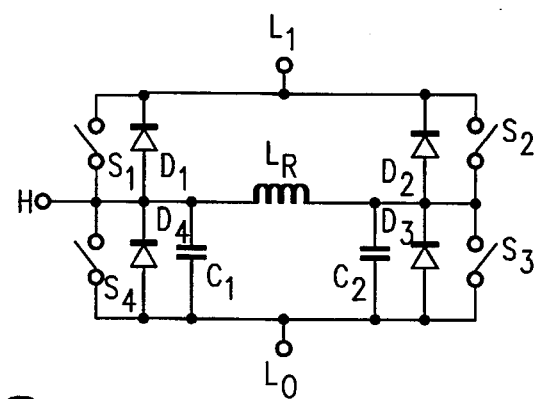
FIG. 22 is a schematic diagram of a generalized Resonant Switching Bridge according to the present invention.

Central to the novel converter configuration is a full-bridge switching circuit comprised of four diodes, $D_1$–$D_4$ and two (three, or four) active (semiconductor) switches, $S_1$–$S_4$ (FIG. 22). If MOSFET's are used, the body diode of each MOSFET may serve as one of the four required diodes. A resonant inductor $L_r$ is connected across the bridge between nodes a and b, and parasitic capacitance of the diodes $D_1$–$D_4$ and active switches $S_1$–$S_4$ are incorporated in the L-C circuit. Connected in parallel with the bridge is a voltage source or sink, depending on the direction that power will flow, and connected to node a or b is a current source or sink, again depending upon the direction of power flow.

The present invention stores sufficient energy in the resonant inductor $L_r$ so that prior to each switch or diode commutation, charge present on the corresponding parasitic capacitance of that semiconductor to be commutated may be removed by the current drawing action of the inductor $L_r$. In this way, all diodes $D_1$–$D_4$ and active switches $S_1$–$S_4$ truly operate with ZVS. The novel bridge configuration accomplishes at least three tasks: It directs the power flow from the source to the load, it passively guarantees voltage limitation across each diode and switch, and it provides volts-seconds balance for the resonant inductor.

Recall that conventional switch-mode converters operated in continuous conduction mode possess two topological states: An idle state, and a power transfer state. In the novel converter provided by the present invention, these two states are also present, and they may exist during a switching cycle as long as desirable. In this way true constant frequency control is attained. Either state is generated by causing the upper two switches/diodes or lower two switches/diode to conduct. For example, in a Boost converter, the conduction of the lower two switches/diodes $S_4$, $D_4$ and $S_3$, $D_3$ corresponds to the idle state when energy from the source flows into the input inductor $L_i$. When the two upper switches/diodes $S_1$, $D_1$ and $S_2$, $D_2$ are on, the input current flows to the output (capacitor $C_o$ and load $R_o$) corresponding to the power transfer state.

This novel switching technique will be demonstrated by first considering the Boost converter; however, in general, the invention may be used with any converter which possesses both a voltage source or sink, and a current source or sink. A Boost converter, for example, possesses a current source at its input and a voltage sink at its output, while a Buck converter possesses a voltage source at its input, and a current sink at its output. In any case, the voltage stresses on all semiconductor devices will be limited by the value of the voltage source or sink in the circuit. As another example, the switch voltage stress in the Buck/Boost converter will be the input voltage plus the output voltage, identical to the switch-mode case.

FIGS. 19–21 show a Boost converter employing the ZVS constant frequency switching bridge according to the present invention. It should be noted that the active switch and rectifying diode of a conventional switch-mode Boost converter have both been replaced by the switching bridge of the present invention comprising four diodes and two or more active switches. Diode $D_1$ of FIG. 19 corresponds to the rectifying diode of a conventional switch-mode Boost converter, and switch $S_3$ of FIG. 19 corresponds to the active switch of a conventional switch-mode Boost converter.

Figure 1:
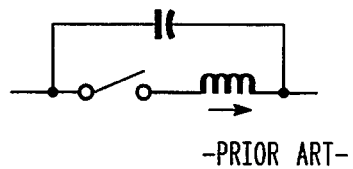
FIGS. 1–3 are schematic diagrams of a prior art Zero Current Switch (ZCS)
Figure 4:
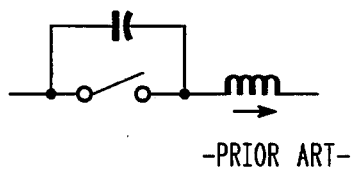
FIGS. 4–6 are schematic diagrams of a prior art Zero Voltage Switch (ZVS).
Figure 2:
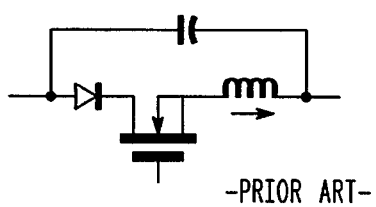
Figure 5:
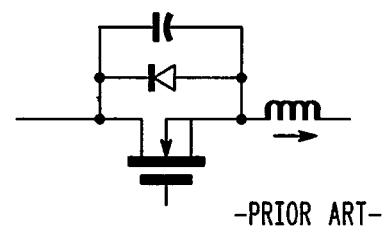
Figure 3:
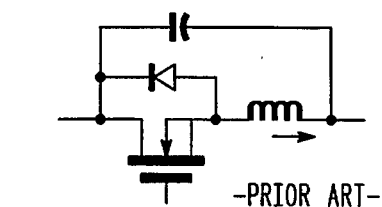
Figure 6:
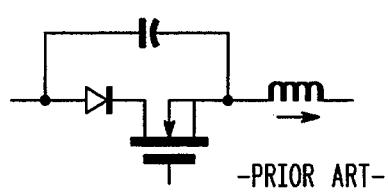
Figure 7:
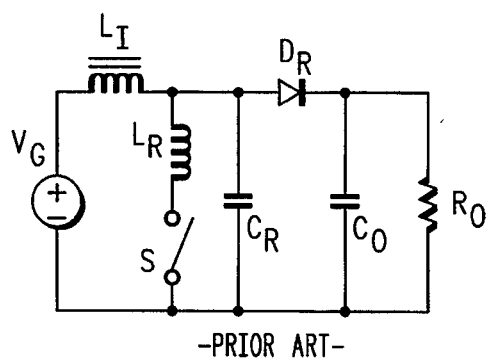
FIG. 7 is a schematic diagram of a prior art ZCS Boost Quasi-Resonant Converter (QRC).
Figure 8:
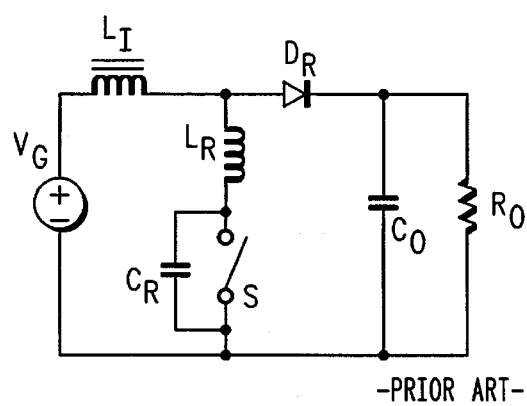
FIG. 8 is a schematic diagram of a prior art ZVS Boost QRC.
Figure 9:
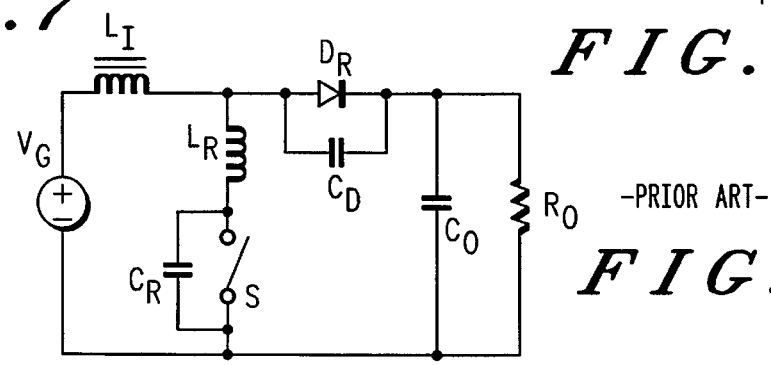
FIG. 9 is a schematic diagram of a prior art ZVS Boost Multi-Resonant Converter (MRC).
Figure 10:
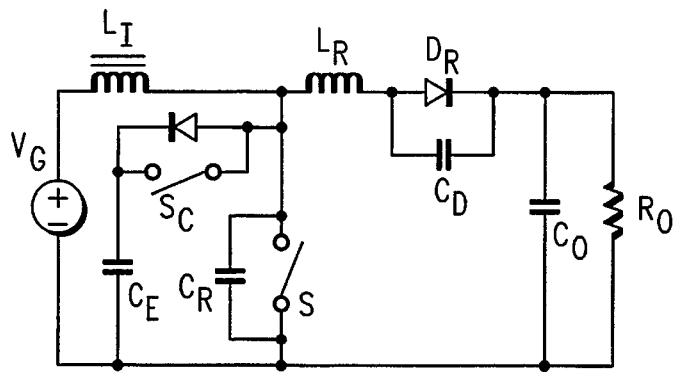
FIG. 10 is a schematic diagram of a prior art ZVS Boost MRC with voltage clamping.
Figure 11:
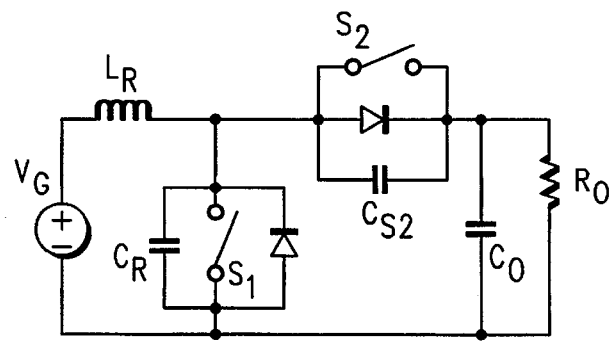
FIG. 11 is a schematic diagram of a prior art ZVS Boost Quasi-Square Wave Converter (QSWC).
Figure 12:
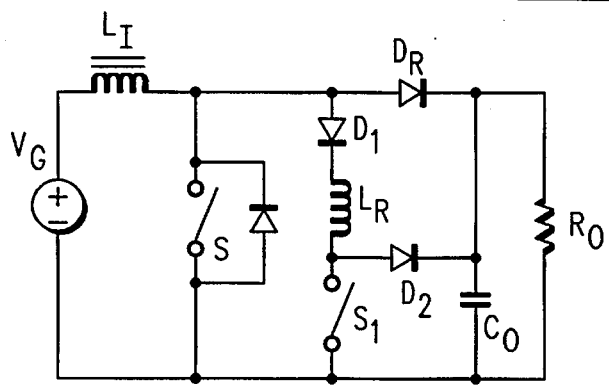
FIG. 12 is a schematic diagram of a prior art Boost converter with auxiliary switch.
Figure 13:
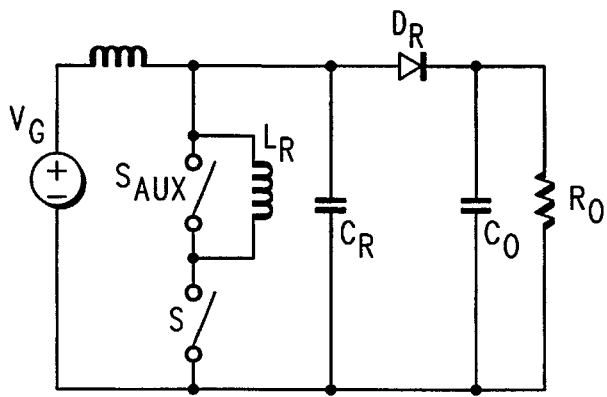
FIG. 13 is a schematic diagram of a prior art ZVS/ZCS Parallel Mode Converter.
Figure 14:
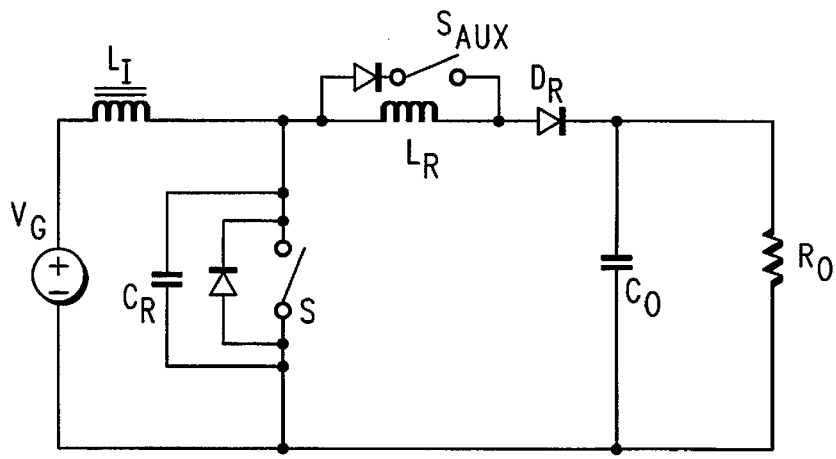
FIG. 14 is a schematic diagram of a prior art ZVS/ZVS Parallel Mode Converter.
Figure 15:
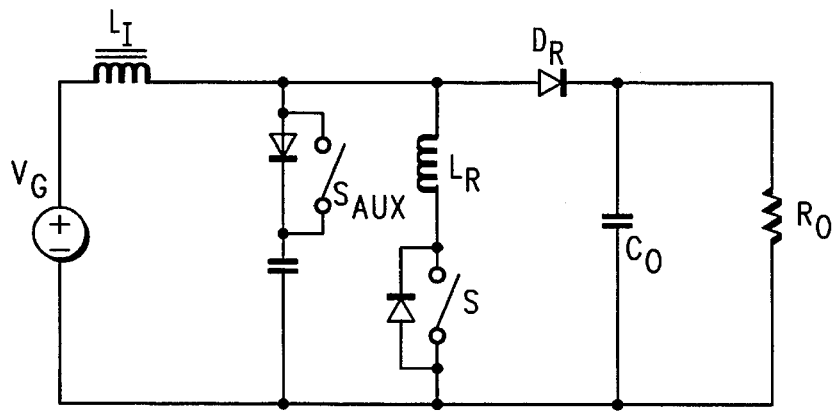
FIG. 15 is a schematic diagram of a prior art ZCS/ZCS Series Mode Converter.
Figure 16:
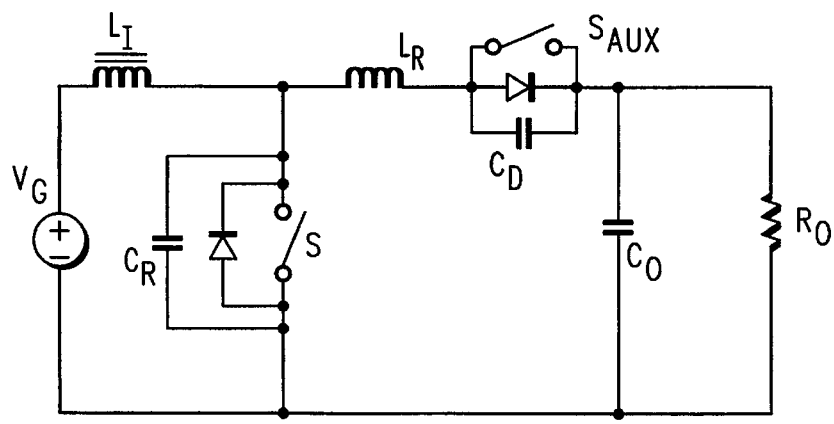
FIG. 16 is a schematic diagram of a prior art ZVS Boost MRC.
Figure 17:
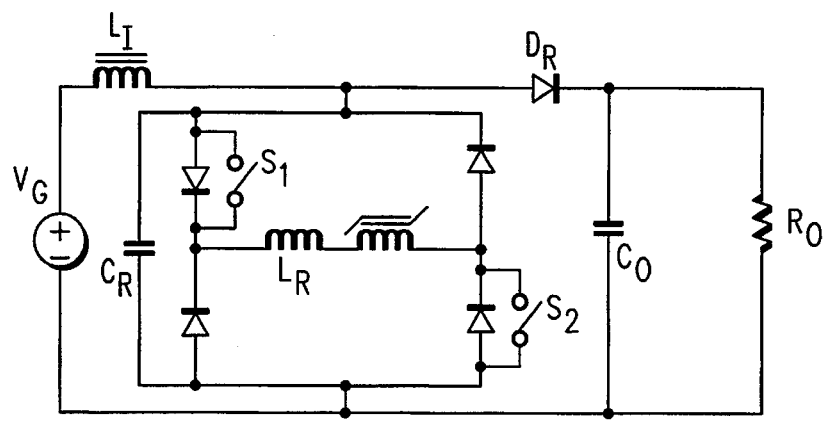
FIG. 17 is a schematic diagram of a prior art ZVT Boost Converter with Switch Module.
Figure 18:
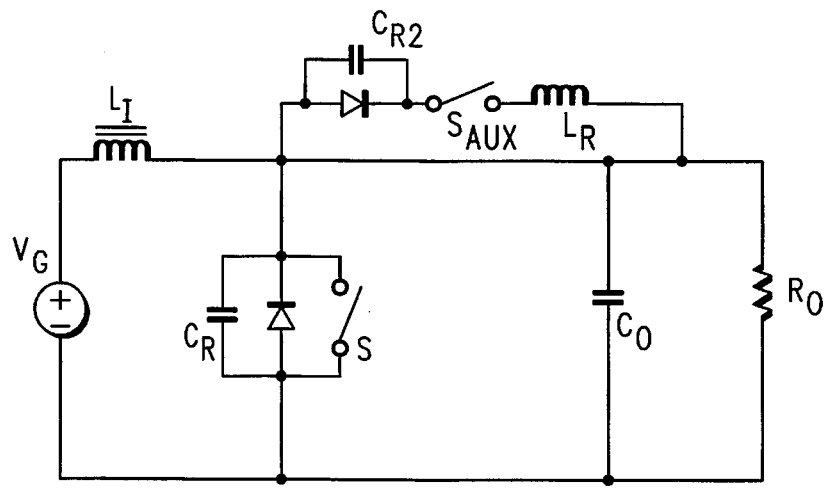
FIG. 18 is a schematic diagram of a prior art ZVT Boost Converter with Auxiliary LC Switch.

In this novel circuit as many as eight parasitic capacitances (not shown) may exist corresponding to the four diodes $D_1$–$D_4$ and four active switches $S_1$–$S_4$ present in the circuit of FIG. 15. If MOSFETS were used then each active switch and its adjacent parallel diode would comprise one semiconductor device (not shown) thus producing one associated parasitic capacitance. In addition, external resonant capacitors (not shown) may be added across any of these semiconductors if they are needed for achieving the proper total required capacitance. As mentioned previously, the switching bridge is always connected in parallel with a voltage source or voltage sink. In practice, these voltage sources/sinks (not shown) possess one or more large filtering capacitors which help lower their input impedance and consequently reduce voltage ripple across them. Because of this circuit configuration, all capacitance present in parallel with diode $D_1$ may be combined with all capacitance present in parallel with diode $D_4$ to form one equivalent capacitance called $C_1$ (FIGS. 19–21).

This circuit transformation is used to simplify the analysis of the novel converter, and does not affect the theoretical operation or performance in any way. A similar explanatory transformation may be carried out with capacitances present in parallel with diodes $D_2$ and $D_3$. These capacitances may be represented by an equivalent capacitance $C_2$. It should be noted that external capacitances may be added in many ways in order to achieve the desired equivalent capacitances $C_1$ and $C_2$. For instance, in the Boost converter of FIG. 19, a capacitor connected between node a (the common node between diodes $D_1$ and $D_4$) and node c (the node joining the input voltage source $V_g$ and input inductor $L_i$) may be removed and its value added to the value of the equivalent capacitance $C_1$. In general, if an externally added capacitor possesses a voltage rate of change equal in magnitude to the voltage rate of change across $C_1$, then it may be removed and its value may be combined with that of capacitor $C_1$. Similarly, if an externally added capacitor possesses a voltage rate of change equal in magnitude to the voltage rate of change across $C_2$, then it may be removed and its value may be combined with that of capacitor $C_2$.

A fundamental operating objective of the novel converter is to alternatively turn switches $S_1$ and $S_3$ on thus providing the two essential idle state and power transfer states for achieving constant frequency operation. As mentioned previously, the resonant inductor $L_R$ enables the charge on each parasitic switch capacitance to recirculate prior to switch turn-on, and diodes $D_1$ and $D_4$ ensure that the volts-seconds balance across the inductor $L_R$ is maintained.

As is inherent in most ZVS constant frequency converters, high circulating currents often result as a side effect of ZVS. During the idle state, the Boost converter of FIG. 19 will possess a circulating current value (through the inductor) of $I_g + V_o/Z_{o1}$ where $Z_o$ i=$(L/C\ 1)^{1/2}$. At high output voltage, this current could be substantial. By increasing the value of the characteristic impedance $Z_{o1}$, this circulating current is greatly reduced. However, in order for the resonant inductor to remove all the charge on $C_2$, $Z_{o1}$ must be smaller than $V_o/I_g$, maybe half that amount. At low power levels, this is not problematic, but at higher levels, efficiencies gained by ZVS may be lost to conduction losses.

Figure 28:
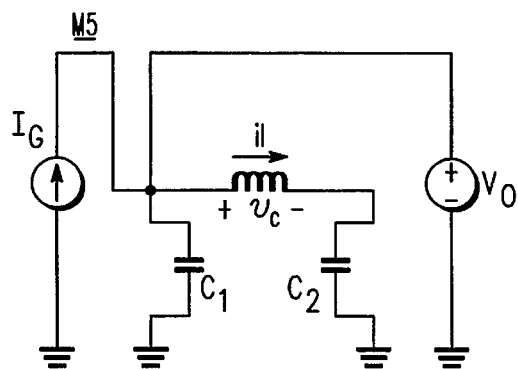

To solve this problem, the present invention contemplates that another active switch $S_4$, be placed across diode $D_4$, (FIG. 20)enabling a small amount of energy to return from the output load and replenish the inductor to ensure that capacitor $C_2$ may be fully discharged during circuit mode M5 (FIG. 28). With the help of the third active switch, $Z_{o1}$ reduces high circulating currents. With only two active switches, ZVS operation is accomplished when $C_1$ is larger than $C_2$. With a second auxiliary switch added, the circuit operation is simplified since $C_1$ no longer need be larger than $C_2$ for ZVS operation. Only at light load does ZVS operation cease when $C_1=C_2$. For this reason, the instant invention provides $C_1>C_2$. This type of novel Boost converter is shown in FIG. 20, $C_1$ may equal $C_2$, to simplify operation and analysis. If $C_1$ and $C_2$ are chosen to be equal but ZVS operation is desired at light load as well as at heavy load, then a third auxiliary switch $S_1$ can be added in parallel with diode $D_1$ (FIG. 21). In this way, sufficient energy from the voltage sink may flow back into the resonant inductor $L_R$, in preparation for discharging capacitor $C_1$. As will be seen, smaller $C_1$ values are preferred for lower circulating currents as well as higher switching frequencies. Therefor at times, making $C_1=C_2$ is preferred over making $C_1>C_2$ in the present invention.

The novel switching bridge described herein may be implemented in many ways as one of ordinary skill can appreciate. As mentioned above, the bridge, according to the invention, includes four diodes, but the number of active switches may vary (FIGS. 19–21). The minimal implementation requires two active switches, (noted as $S_2$ and $S_3$ throughout this document). As mentioned previously, a third switch (denoted as $S_4$) may be added across diode $D_4$ to allow wider load range and lower circulating currents. In general, a fourth switch $S_1$ across diode $D_1$ will, in some designs, further increase load range and decrease circulating currents. It should be noted that load range, as used herein, refers to the minimum to maximum output load over which ZVS is maintained on all switches/diodes.

Diode $D_1$ corresponds to the rectifying diode of a conventional switch-mode single-ended converter, and active switch $S_3$ corresponds to the active switch of a conventional single-ended switch-mode converter. Diodes $D_2$, $D_3$, and $D_4$ as well as active switches $S_1$, $S_2$, and $S_4$ carry only a fraction of the input current. These diodes and switches are required primarily for recirculating energy stored in capacitors $C_1$ and $C_2$ and inductor $L_r$. For example, in a 350 W converter where input current may be as high as 5 Amps, and the output voltage is 400 V, circulating currents may be on the order of 1 to 3 Amps, therefor rms currents in the smaller diodes and switches may be only 1–2 Amps.

Novel converter operation sequence is therefore essentially independent of the number of active switches used. The exemplary Boost converter of FIGS. 19–21 will be used to describe this novel ZVS technique, however, it should be understood that the principles described herein apply to a large number of converter topologies including but not limited to the family of singled-ended switch-mode converters.

In describing the novel converter operation of FIG. 19, it is assumed that the input inductor $L_i$ and input source $V_g$ form a constant current source $I_g$. The output filter consisting of the filter capacitor $C_o$ and the load $R_o$ form a constant voltage sink $V_o$. All diodes and active switches are considered ideal. The Boost converter circuits of FIGS. 19–21 may be further simplified to that of FIG. 23.

The converter operation may be understood in light of the topological circuit modes of FIGS. 24–31 and the state-plane diagrams of FIGS. 32–35, wherein switching sequence is shown adjacent to each circuit mode trajectory. Two normalizations for all currents, times, and impedances are used, since circuit modes exist in which either $C_1$ or $C_2$ resonate with resonant inductor $L_r$. For this reason, apparent discontinuities along the state-plane trajectory can exist. The following normalizations are used:

$$Z_{o1} = \sqrt{L_r/C_1} \quad ; \quad Z_{o2} = \sqrt{L_r/C_2}$$

$$\omega_{o2} = \frac{1}{\sqrt{L_r C_2}} \quad ; \quad \omega_{o1} = \frac{1}{\sqrt{L_r C_1}}$$

$Z_{o1}$ and $Z_{o2}$ are the circuit characteristic impedances, and $\omega_{o1}$ and $\omega_{o2}$ are the natural angular frequencies. Because two resonant capacitors exist in the circuit, it is convenient to define an expression which will relate them. We define the capacitor ratio constant k as:

$$k \doteq 1 + \frac{\omega_{o2}}{\omega_{o1}} = \sqrt{1 + C_1/C_2}$$

The various normalized quantities may be distinguished by the two subscripts n' and n" or simply by a 'or". In general, normalized current will be defined as:

$$i_{n'} \doteq i \frac{Z_{o1}}{V_g} \quad ; \quad i_{n''} \doteq i \frac{Z_{o2}}{V_g}$$

Normalized times (referred to also as equivalent conduction angles,) are denoted by $\alpha_{if}$, $\beta_{if}$ and $\delta_{if}$, where the subscripts i and f refer to the initial and final times $t_i$ and $t_f$ of the time quantity being normalized. The three normalizations are shown for $\alpha$'s only, but are defined identically for $\beta$'s and $\delta$'s.

$$\alpha_{if} = \omega_\alpha (t_f - t_i); \; \alpha_{if} \, \omega_\alpha (t_f - t_i)$$

The load impedance has also been normalized using the characteristic impedances defined above:

$$Q' = R_o/Z_{o1}; \; Q'' = R_o/Z_{o2}$$

Finally, the switching frequency of the converter has been normalized using the natural resonant frequencies of the L-C tank circuit:

$$f_{sn'} \doteq f_s \frac{2\pi}{\omega_{o1}} \quad ; \quad f_{sn''} \doteq f_s \frac{2\pi}{\omega_{o2}}$$

Quantities normalized by the two normalizations may be related by the capacitor ratio constant k:

$$i_{n''} = \sqrt{k^2 - 1} \; i_{n'}; \quad i_{n'} = \frac{1}{\sqrt{k^2 - 1}} \; i_{n''}$$

$$\alpha_{if'} = \sqrt{k^2 - 1} \; \alpha_{if'}; \quad \alpha_{if'} = \frac{1}{\sqrt{k^2 - 1}} \; \alpha_{if'}$$

$$Q_{1'} = \sqrt{k^2 - 1} \; Q_{1''}; \quad Q_{1''} = \frac{1}{\sqrt{k^2 - 1}} \; Q_{1'}$$

$$f_{sn'} = \sqrt{k^2 - 1} \; f_{sn''}; \quad f_{sn''} = \frac{1}{\sqrt{k^2 - 1}} \; f_{sn'}$$

Figure 36:
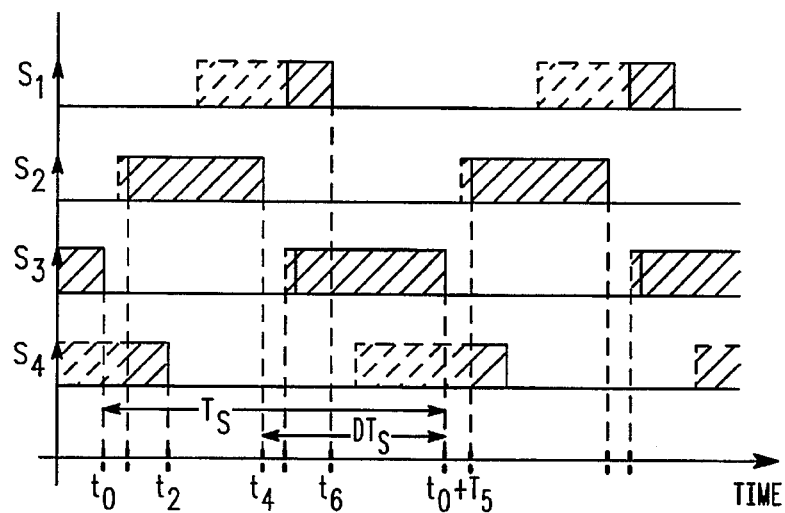
FIG. 36 shows typical switching waveforms for the Converter of FIG. 19.
Figure 37:
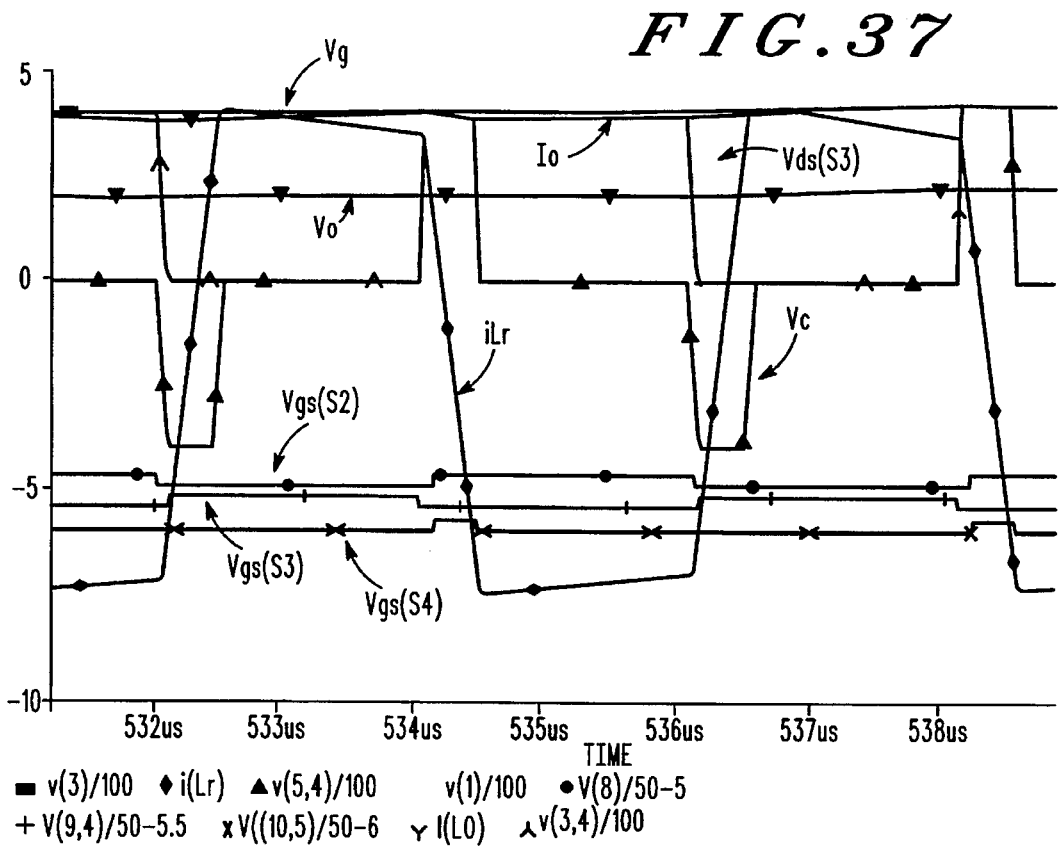
FIG. 37 depicts simulated waveforms of the Converter of FIG. 20 with ¾ active configuration.
Figure 38:
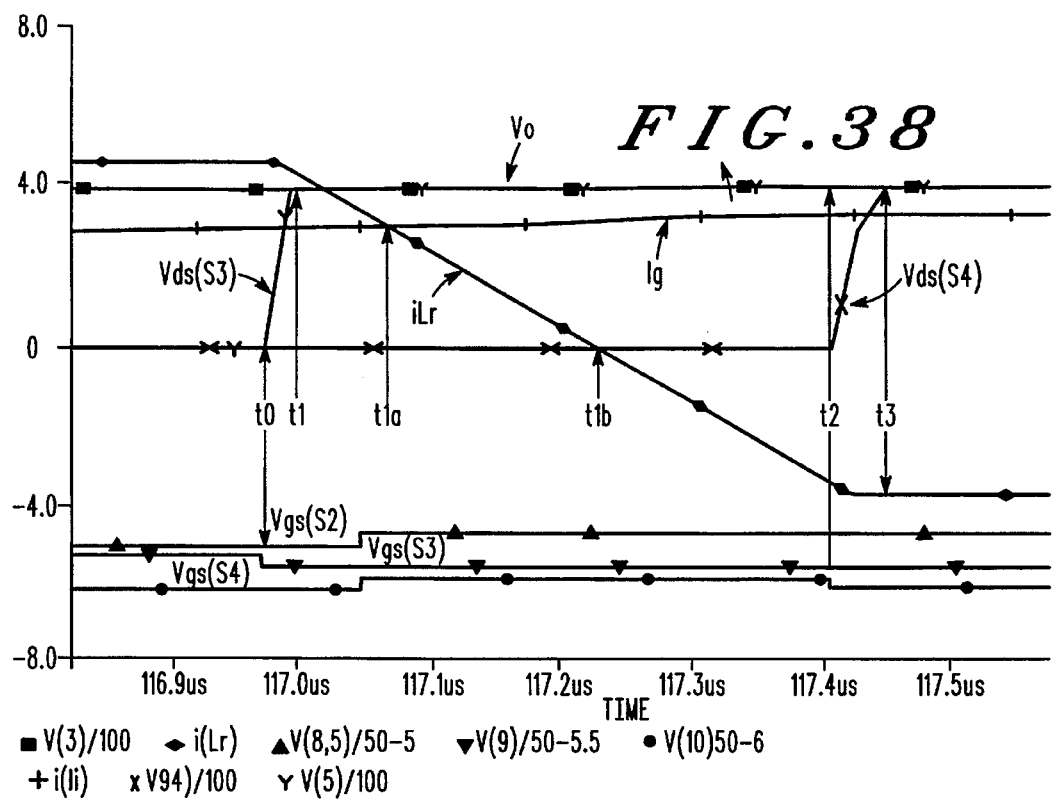
Figure 39:
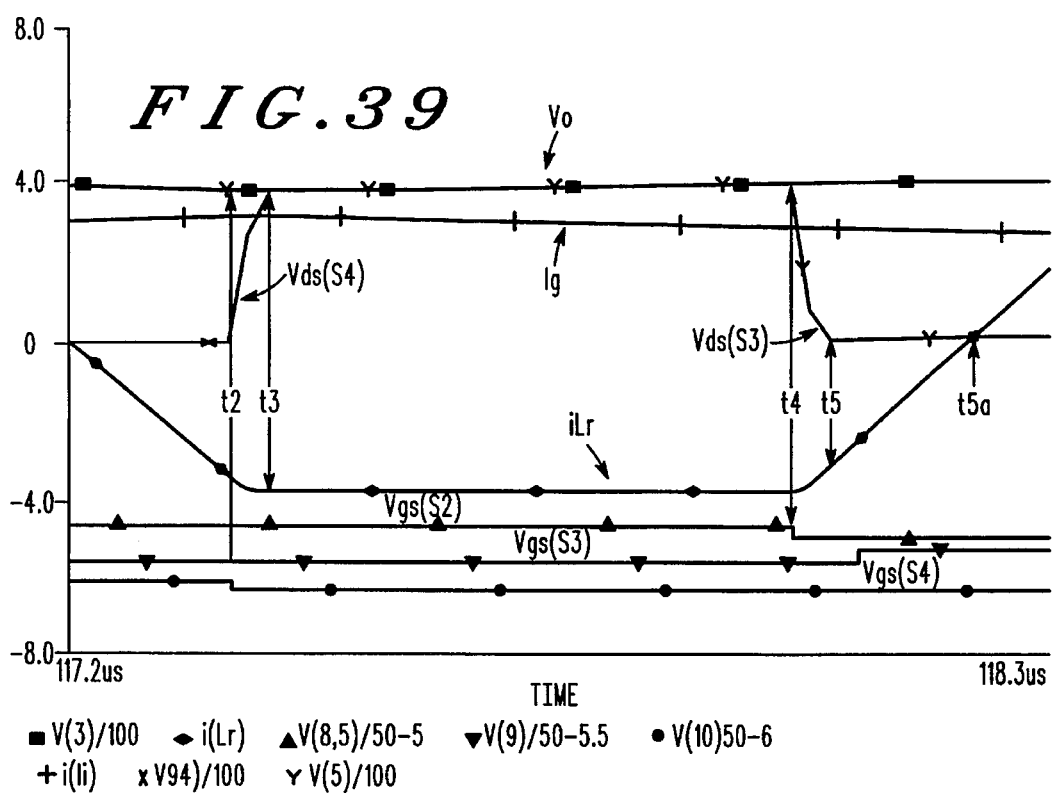

Exemplary switching waveforms provided by the instant invention are shown in FIG. 36. FIGS. 37–44 show simulation waveforms of the Boost converter of FIG. 19–21. In FIG. 37, exemplary waveforms from a three-quarter-active configuration are shown. FIGS. 38–41 show in detail the waveforms of interest for various time intervals over a switching cycle.

Prior to time $t_0$, switch $S_3$ and diode $D_4$ are on and current in the amount greater than the input current $I_g$ flows through the resonant inductor $L_r$. The amount of current through the resonant inductor $L_r$ in excess of the input current $I_g$ flows through diode $D_4$. This period is represented by circuit mode M8 (FIG. 31) and corresponds to the idle state of the switch-mode Boost converter in which energy from the source flows into the input inductor $L_i$. If the three or four active switch configurations of FIGS. 20 and 21 are implemented, then switch $S_4$ may be turned on with ZVS during this time.

Figure 24:
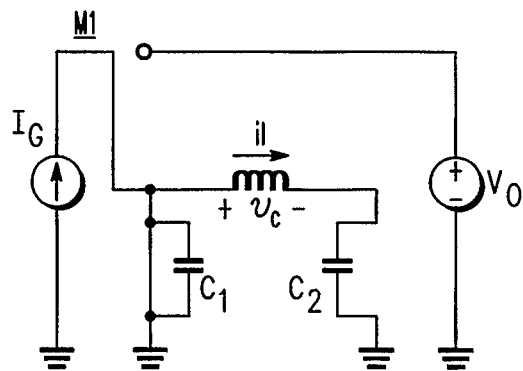
FIGS. 24–31 show topological circuit modes M1–M8 for the Converters of FIG. 21 as provided by the instant invention.

At time $t_0$, the main switch ($S_3$) is turned off with ZVS, and the resonant inductor current begins to flow through capacitor $C_2$. The converter is in circuit mode M1 (FIG. 24). The voltage on the capacitor $C_2$ increases sinusoidally until it reaches the output voltage $V_o$.

Figure 25:
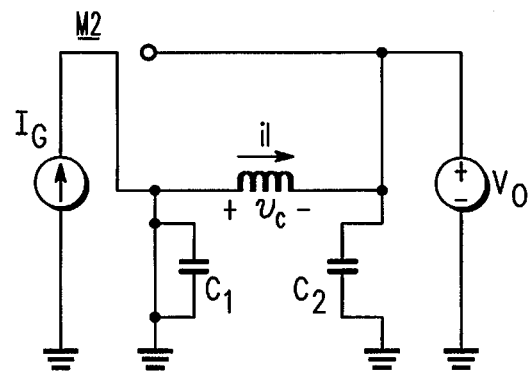

At time $t_1$, the voltage on capacitor $C_2$ reaches the output voltage $V_o$, and diode $D_2$ turns on. The novel converter is now in circuit mode M2 (FIG. 25). The current through the resonant inductor $L_r$ begins to decrease linearly since a constant voltage of $-V_o$ exists across it. While the inductor current is still greater than zero, switch $S_2$ may be turned on with ZV across it.

Figure 26:
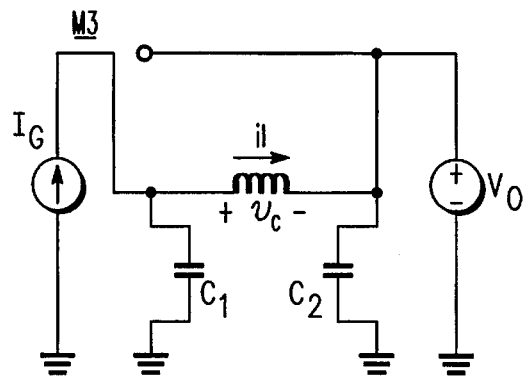
Figure 42:
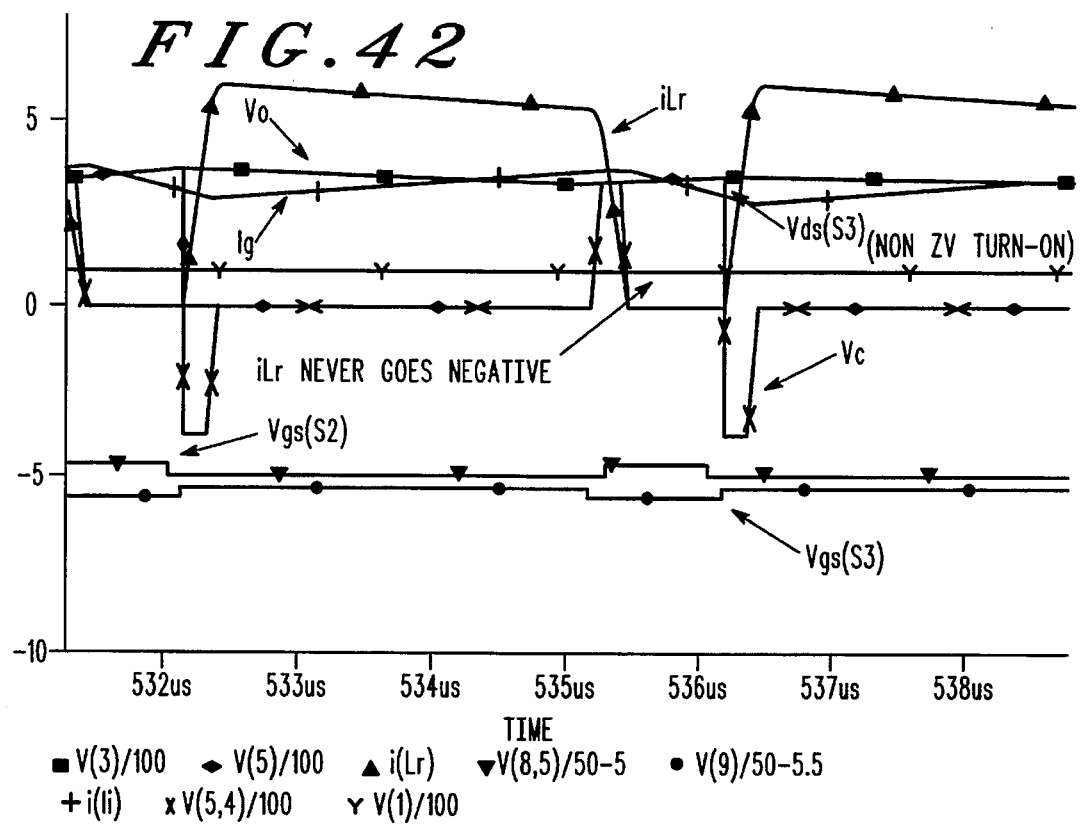
FIG. 42 depicts simulated waveforms of the Converter of FIG. 19 with half-active configuration.
Figure 43:
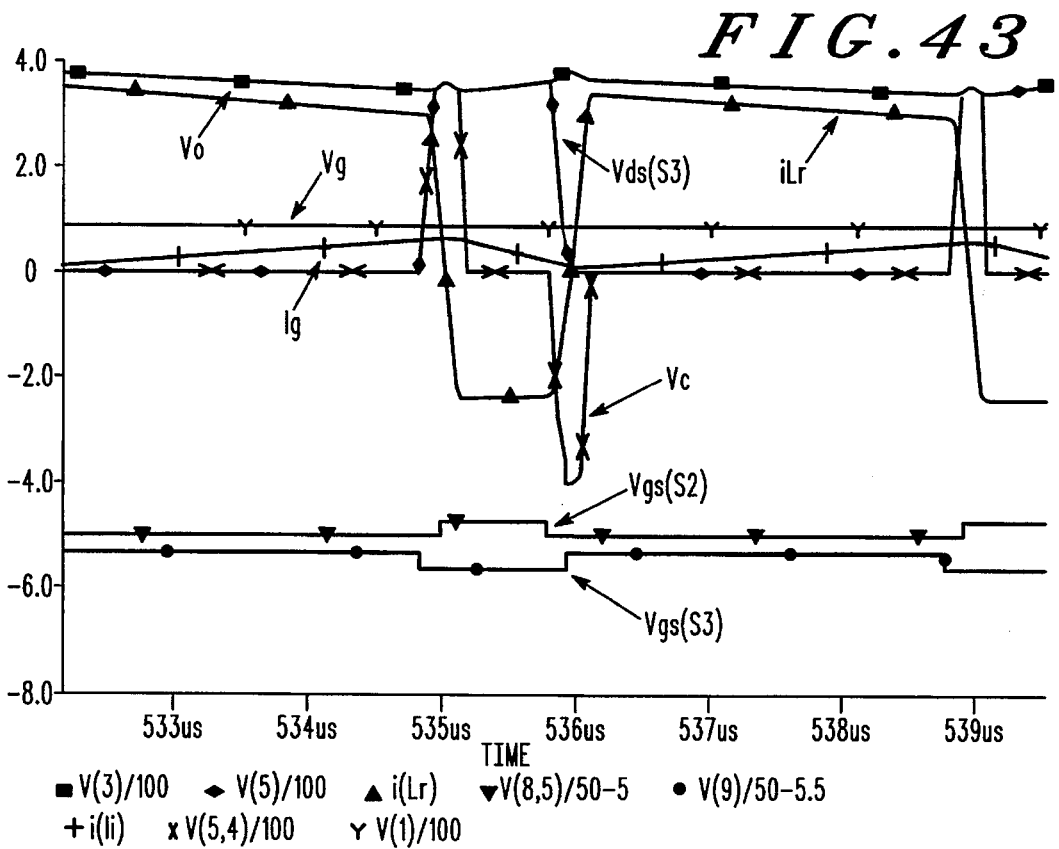
FIG. 43 depicts simulated waveforms of the Converter of FIG. 19 with ½ active configuration.
Figure 44:
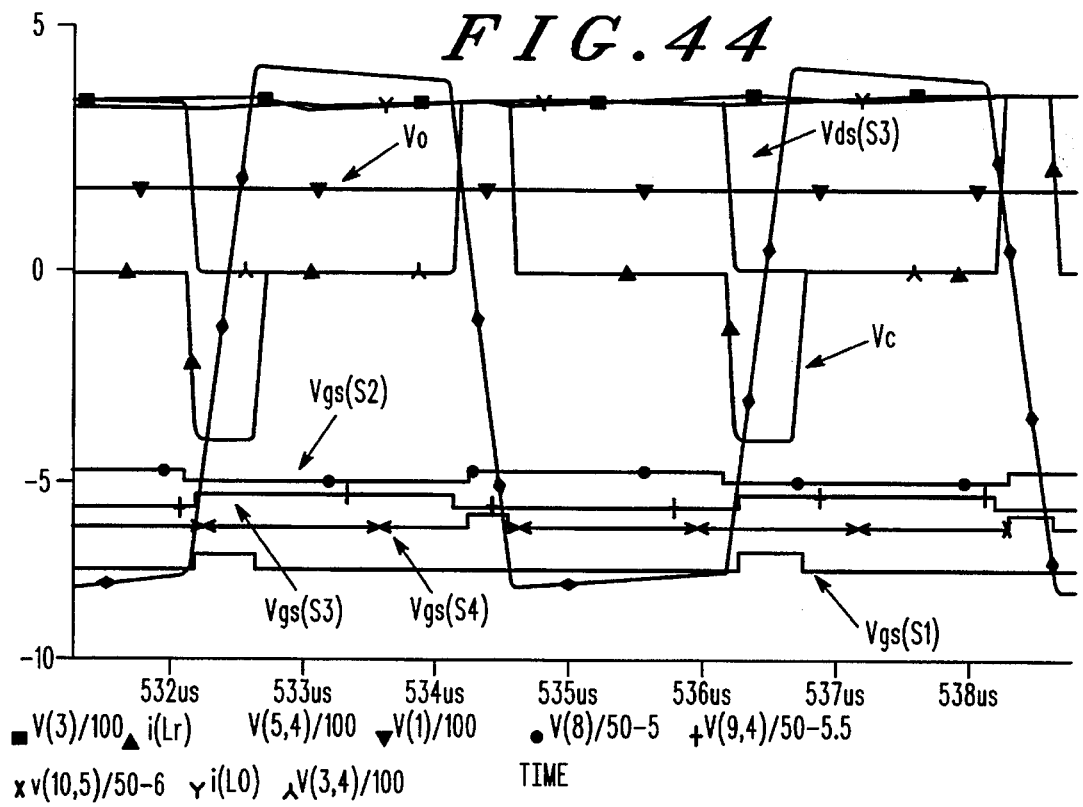
FIG. 44 depicts simulated waveforms of the Converter of FIG. 19 with full active configuration.

At time $t_2$, diode $D_4$ (half active configuration, FIG. 19), or active switch $S_4$ (¾ or full active configurations, FIGS. 20 and 21) turns off, and current $I_g - i_l$ begins flowing into capacitor $C_1$. The voltage on $C_1$ increases sinusoidally. If no active switch $S_4$ is present, then time $t_2$ occurs when the resonant inductor current $i_l$ decreases to $+I_g$. If active switch $S_4$ is present, then time $t_2$ occurs when the switch is actively turned off. Typically, the minimum value (i.e. the largest negative value) for the resonant inductor current $i_l$ may be sensed or programmed in the controller so that switch $S_4$ may be turned off when a predetermined amount of energy has returned from the output voltage sink $V_o$ to the resonant inductor $L_r$. One of ordinary skill can appreciate that the on-time of switch $S_4$ should to be minimized such that only sufficient energy returns to the resonant inductor to guarantee that no charge stored on capacitor $C_2$ may latter be removed such that switch $S_3$ may be turned on with ZVS. The required minimum resonant inductor current value (at time $t_3$) will always be negative. Without the addition of switch $S_4$, the resonant inductor current $i_l$ may fail to change polarity during this mode, and at heavier load fails to regain sufficient energy for latter discharging capacitor $C_2$. FIG. 42 shows simulated waveforms of a half-active configured Boost converter failing to achieve ZVS due to excessive load. FIG. 37 shows simulated waveforms of the same converter in a ¾ active configuration that achieves ZVS on all devices. FIG. 43 shows waveforms of the ½ active Boost converter operating at ZVS at light load. By the addition of switch $S_4$, ZVS is achieved at the turn-on of switch $S_3$. This time interval corresponds to circuit mode M3 (FIG. 26).

Figure 27:
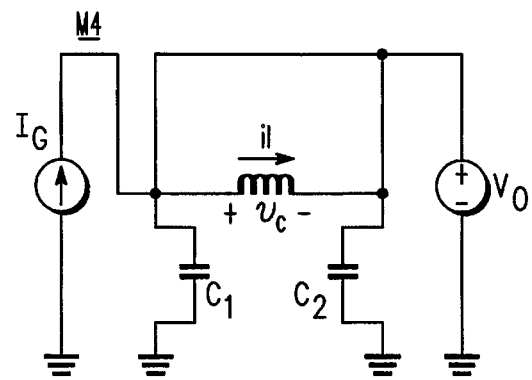

At time $t_3$, the voltage on capacitor $C_1$ reaches the output voltage. The converter is now in circuit mode M4 (FIG. 27). During this time switch $S_2$ and diode $D_1$ conduct current from the resonant inductor $L_r$. Current through $D_1$ equals $1_g + i_l$, and the current through $S_2$ is $i_l$. This is the main power transfer state and corresponds to an equivalent power transfer state in the switch-mode Boost converter. The converter remains in circuit mode M4 until the active switch $S_2$ is turned off. If the four active switch configuration of FIG. 21 is implemented, then switch $S_1$ may be turned on with ZVS during this time.

At time $t_4$, switch $S_2$ turns off signifying the end of the equivalent switch-mode off-time (or power transfer state), and current stored in the resonant inductor $L_r$ begins to flow out of capacitor $C_2$. The voltage on capacitor $C_2$ begins to decrease sinusoidally. This is circuit mode M5 (FIG. 28).

Figure 29:
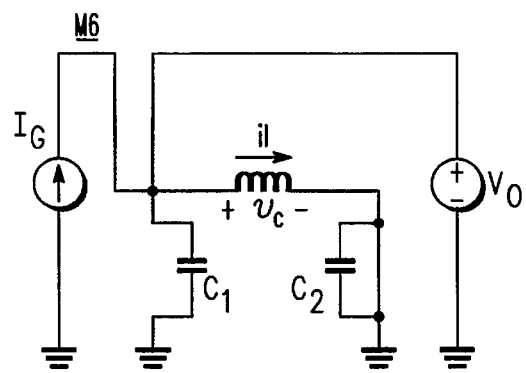

At time $t_5$, the voltage across capacitor $C_2$ reaches zero, and diode $D_3$ turns on causing a constant voltage of $+V_o$ to be applied across the resonant inductor. The novel converter has now commuted to circuit mode M6 (FIG. 29). The resonant inductor current $i_l$ increases linearly. While the resonant inductor current is still negative, switch $S_3$ may be turned on with ZVS.

Figure 30:
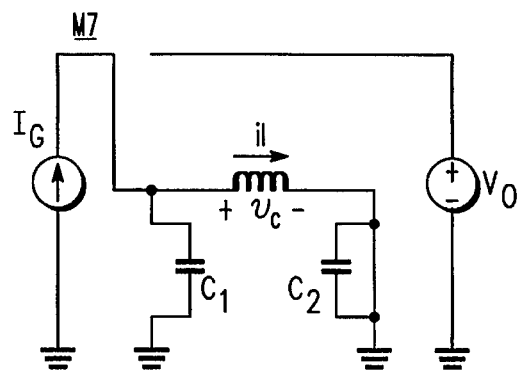
Figure 31:
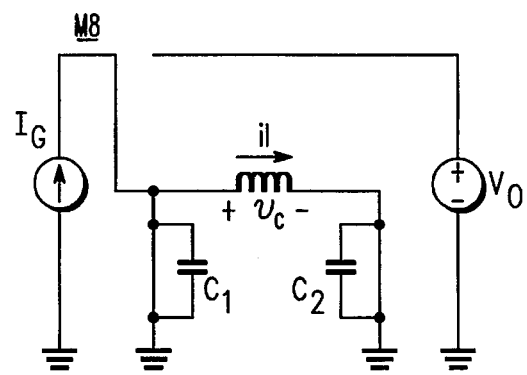
Figure 32:
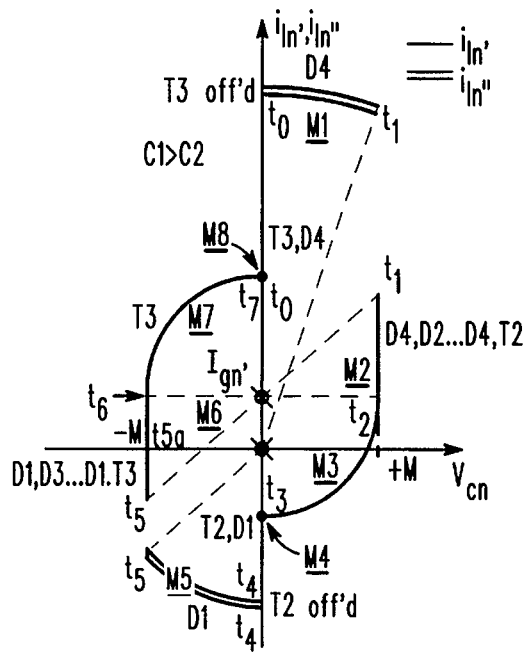
FIGS. 32–35 show state plane diagrams for the Converter of FIG. 19.
Figure 33:
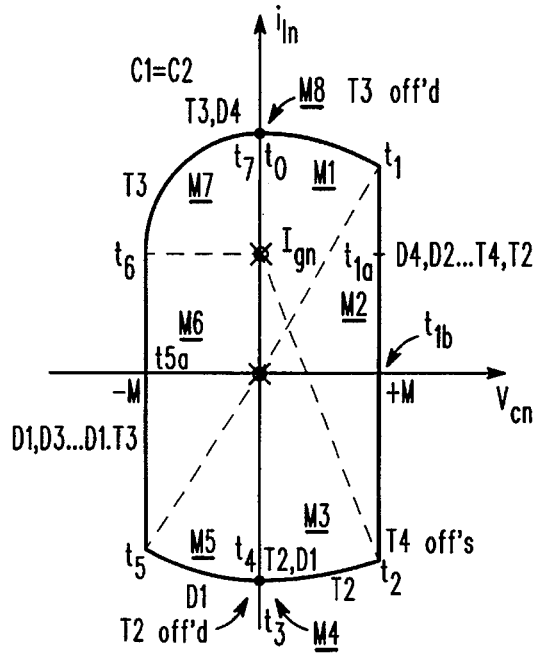
Figure 34:
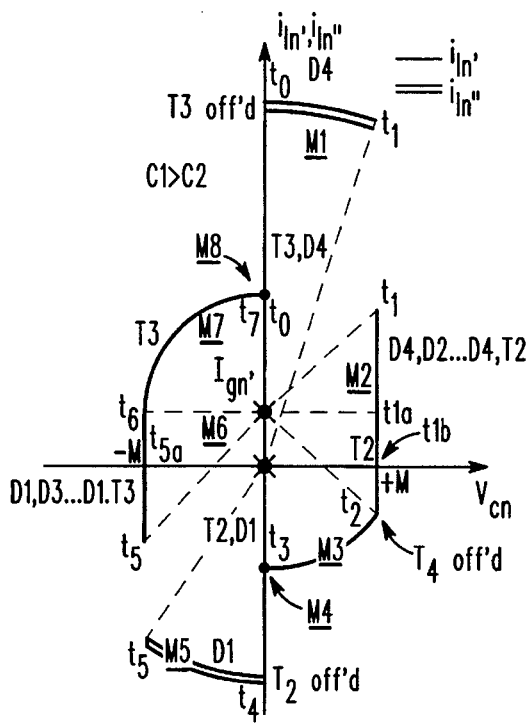
Figure 35:
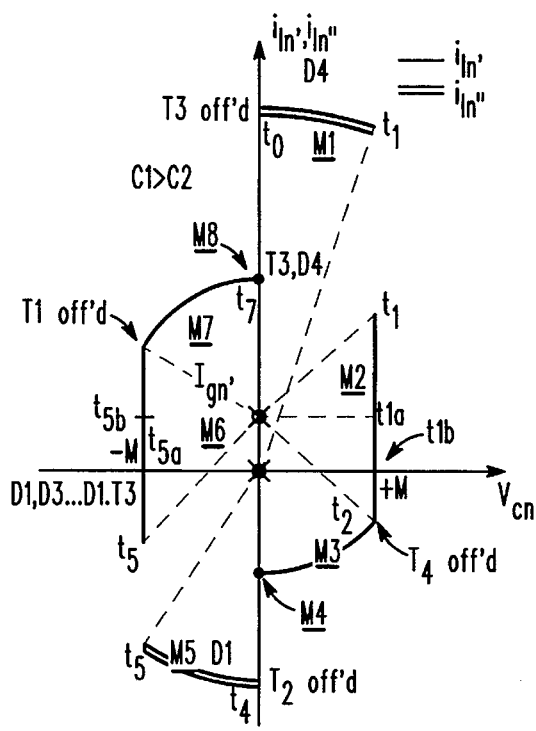

At time $t_6$, either diode $D_1$ turns off when the resonant inductor reaches the input current value of $1_g$ (half or ¾ active configurations, FIGS. 19 and 20), or switch $S_1$ turns off when sufficient energy is stored in the resonant inductor $L_r$ to latter discharge capacitor $C_1$ (full-active configuration, FIG. 21. See FIG. 44 for corresponding simulated waveforms). The novel converter is now in circuit mode M7 (FIG. 30). Resonant inductor current $i_l$ begins exchanging energy with capacitor $C_1$, and the voltage on $C_1$ begins to decrease sinusoidally in magnitude.

At time $t_7$, the voltage on capacitor $C_1$ has reached zero, and diode $D_4$ turns on. Current stored in the resonant inductor circulates through diode $D_4$ and switch $S_4$. This is circuit mode M8 (FIG. 31) and corresponds to the idle state of the switch-mode Boost converter wherein energy from the source flows into the input inductor $L_i$. If the three or four active switch configurations of FIGS. 20 and 21 are implemented, then switch $S_4$ may be turned on with ZVS during this time. The converter remains in this circuit mode until the next switching cycle is initiated by the turn-off of switch $S_3$.

Although the operation described hereinabove relates to a Boost converter, in general the novel principle may be extended to a number of converters. The novel resonant switching bridge of FIG. 22 possesses three node terminals of interest, denoted as $L_0$, $l_1$, and H. In general, these three terminals will be connected to either high or low impedance elements (not shown). Typically, a switching power converter will possess inductors and capacitors as well as switching semiconductors to filter out AC harmonics generated within or without the DC to DC converter. If these filter elements are assumed very large such that voltage on a filtering capacitor and the current through a filtering inductor is approximately constant, then these elements may be referred to as energy buffers. In other words, they do not source or sink any average power, but since energy is stored in them, they may source or sink essentially constant instantaneous power.

If an inductor energy buffer is placed in series with a voltage source, then the voltage source provides average power to the circuit in the form of a constant current source.

The impedance looking into this current source is high since the inductor is in series with the voltage source. In general, voltage sources and capacitor energy buffers may be considered as low impedance elements since they cannot directly affect the current flowing through them. Similarly, current sources and inductor energy buffers may be considered as high impedance elements since they cannot directly affect the voltage across them.

Figure 23:
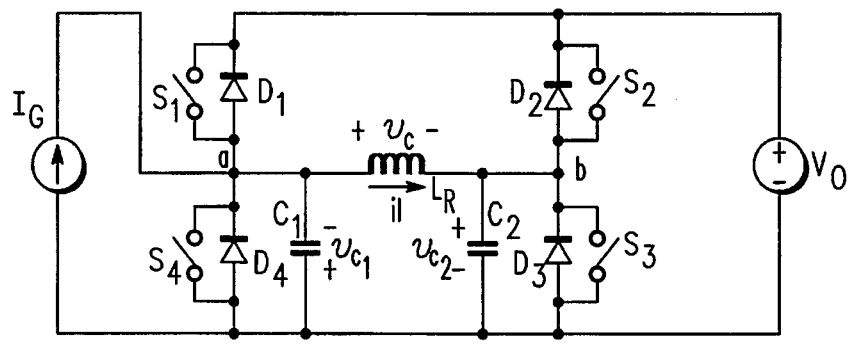
FIG. 23 is a simplified diagram of the circuit of FIG. 21.

Referring to the Boost converter of FIG. 23, we note that a current source $1_g$ feeds into node H of the resonant switching bridge cell. A capacitor energy buffer $C_o$ is positioned between nodes $L_0$ and $L_1$ of the resonant switching bridge cell. Therefor, the impedance between nodes H and $L_0$, as well as between H and $L_1$ is high. However, the impedance between nodes $L_0$ and $L_1$ is low. Although shown for the Boost converter, this will also be true for all converter implementations using the resonant switching bridge cell of the present invention. Although we have assumed that these filtering inductors and capacitors are very large the principles of operation using the resonant switching bridge cell of the instant invention are valid even when this assumption is not satisfied. For example, the operation of the Boost converter could be designed for discontinuous conduction mode as well, and ZVS operation of the novel resonant switching bridge cell would still be possible.

Figure 45:
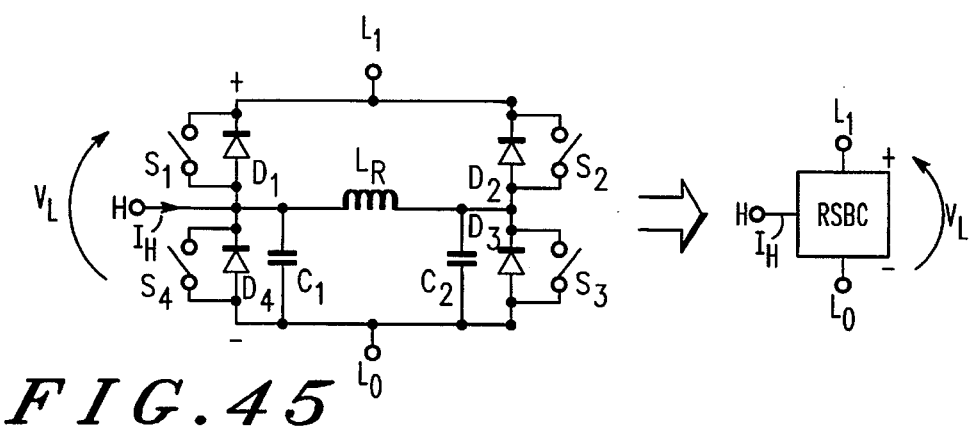
FIG. 45 is a block representation of a Resonant Switching Bridge according to the present invention.
Figure 46:
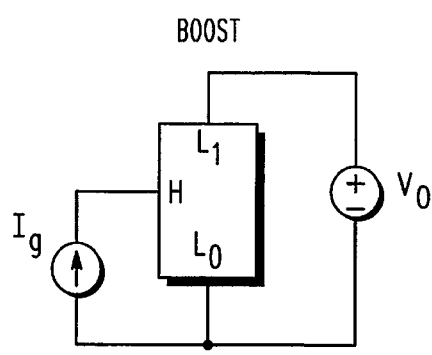
FIGS. 46–51 show block representations of the Resonant Switching Bridge of the invention in various single-ended topologies.
Figure 47:
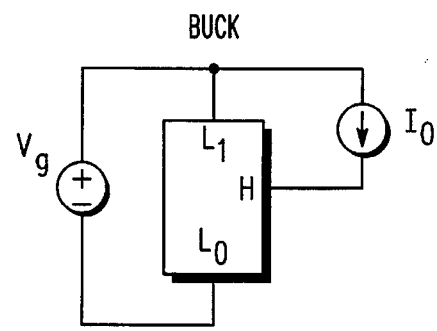
Figure 51:
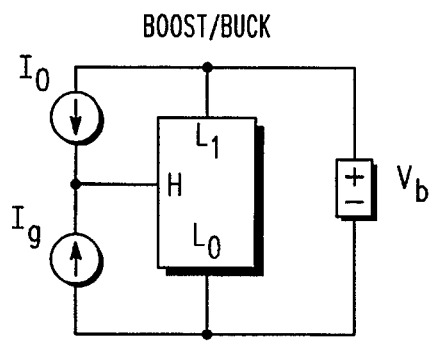
Figure 48:
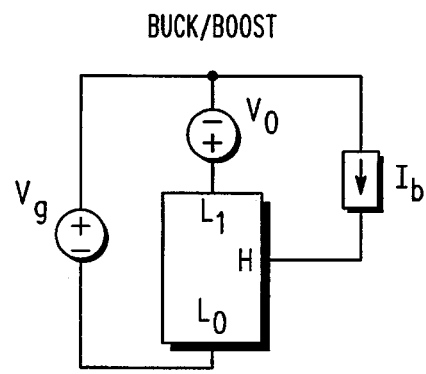
Figure 50:
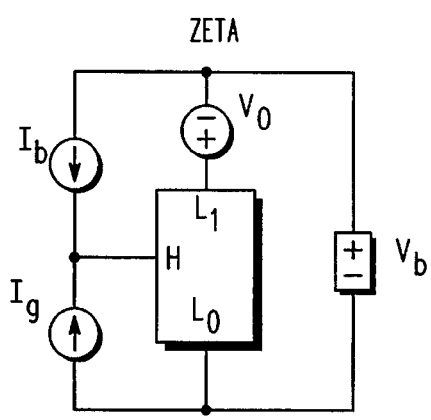
Figure 49:
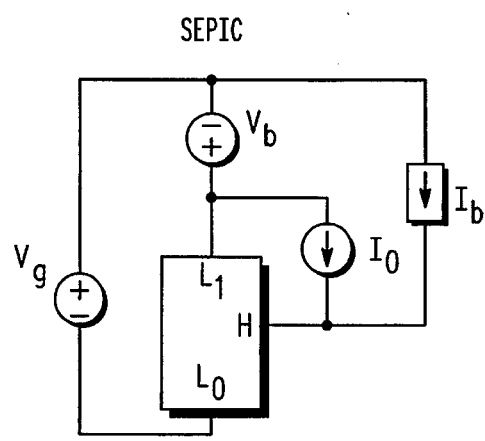
Figure 52:
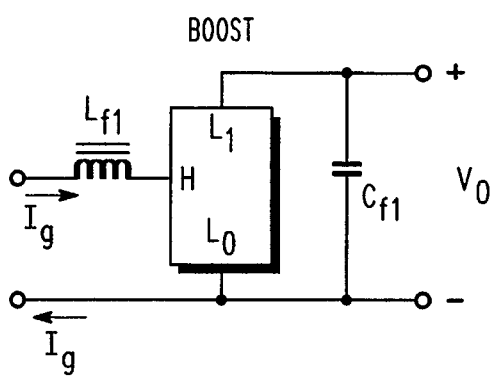
FIGS. 52–57 are additional block representations of the Bridge shown in FIGS. 46–51.
Figure 53:
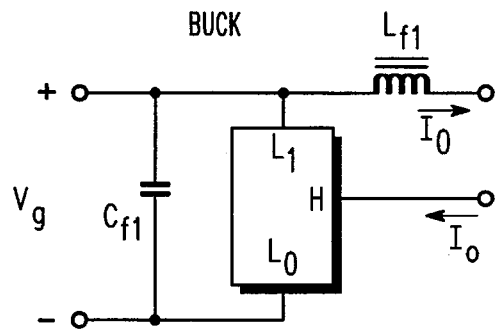
Figure 57:
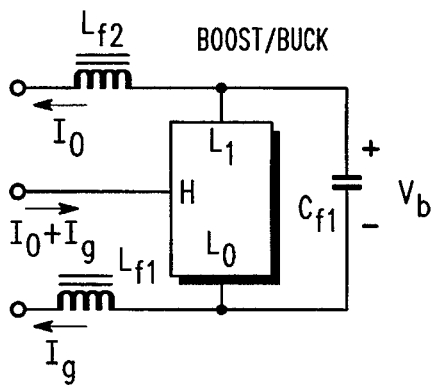
Figure 54:
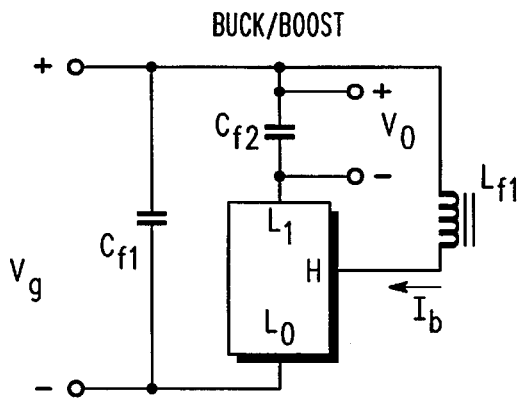
Figure 56:
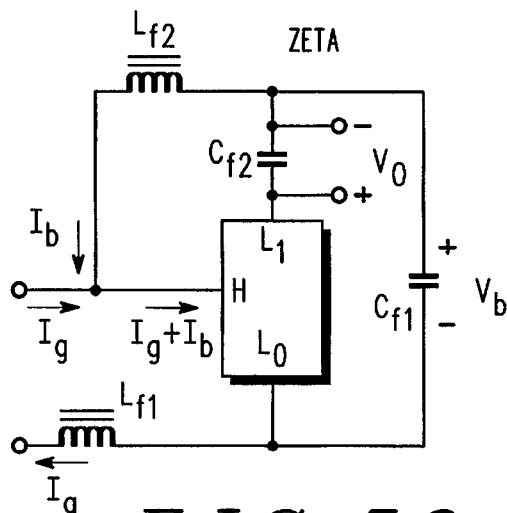
Figure 55:
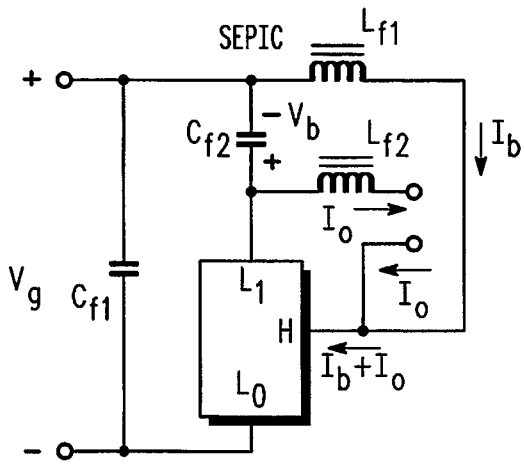

The novel resonant switching bridge cell has been represented as a three terminal device in FIG. 45. By configuring external filter inductors and capacitors appropriately, six basic single-ended switch-mode DC to DC converters are implemented using the resonant switching bridge cell as shown in FIGS. 46–51. FIGS. 52–57 show practical implementation of these same converters using filtering inductors and capacitors. It should be noted that only the minimal number of filtering elements are shown. However, in practice, additional filtering elements can be placed at the input and output of a converter.

In each converter of FIG. 46–51, a nearly constant current $1_H$ flows into node H of the resonant switching bridge cell, and a nearly constant voltage $V_L$ is present across nodes $L_0$ and $L_1$ (assuming continuous conduction mode.) The only difference the resonant switching bridge cell sees in each converter is merely the value of the current $1_H$ and the voltage $V_L$. Table I shows the values of $1_H$ and $V_L$ for each of the six converters of FIGS. 46–51. Output voltages and currents are denoted as $V_o$ and $1_o$ respectively, Input voltages and currents are denoted as $V_g$ and $1_g$ respectively, and energy buffer voltages and currents are denoted as $V_b$ and $I_b$ respectively. Therefor, the operation of the Boost converter described above is identical to that of each of the converters of FIGS. 46–51 with the exception that the current $1_H$ would no longer equal $1_g$, and the voltage $V_L$ would no longer equal $V_o$. Their values are as defined in Table 1.

TABLE I

| Converter | $V_L$ | $I_H$ |
| --- | --- | --- |
| Buck | $V_g$ | $I_o$ |
| Boost | $V_o$ | $I_g$ |
| Buck/Boost | $V_g + V_o$ | $I_b$ |
| Boost/Buck (Cuk) | $V_b$ | $I_g + I_o$ |
| SEPIC | $V_g + V_b$ | $I_b + I_o$ |
| Zeta | $V_o + V_b$ | $I_b + I_g$ |

It should be noted that the switching sequence of the active switches may be implemented in a number of ways as shown in FIG. 36. It can be seen that the turn-off of each active switch is initiated by an external control signal, but the turn-on of each switch must occur at a time when the voltage across the switch to be turned on is zero. In general, there exists a window of time during which the voltage remains zero. This window is usually determined by the direction of current flowing through the active switch or parallel diode. While the parallel diode conducts, the switch voltage is approximately zero. The active switch may be turned on as soon as this diode begins to conduct, but must be turned on before the current in the diode decreases to zero. This is represented in FIG. 36 as dotted lines at the turn-on of each active switch. In other words, the active switches may be turned on any time within a restricted window of time.

Figure 58:
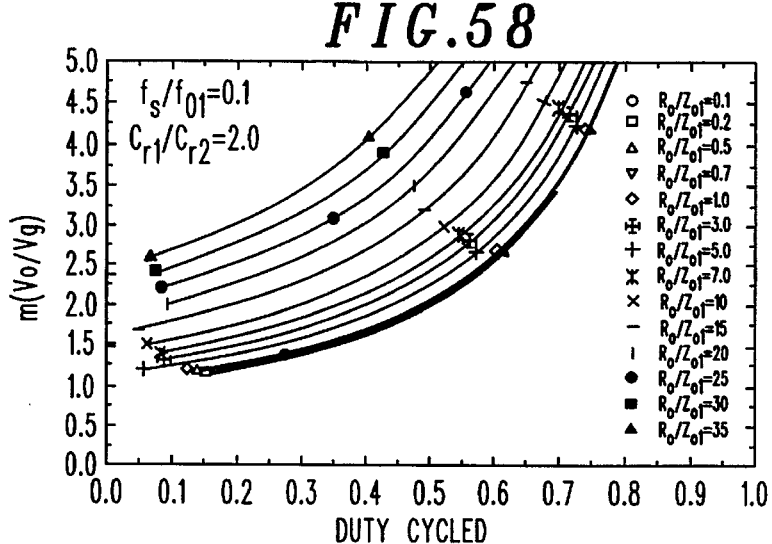
FIGS. 58–60 depicts voltage gain curves of the present invention.
Figure 59:
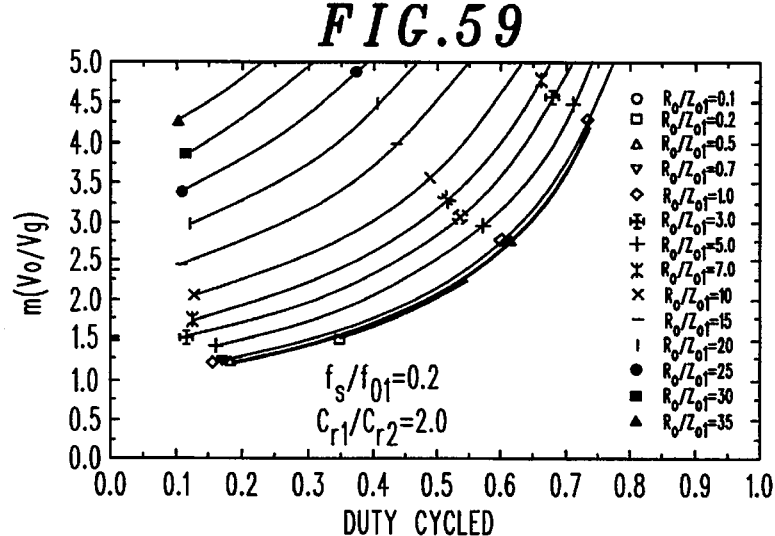
Figure 60:
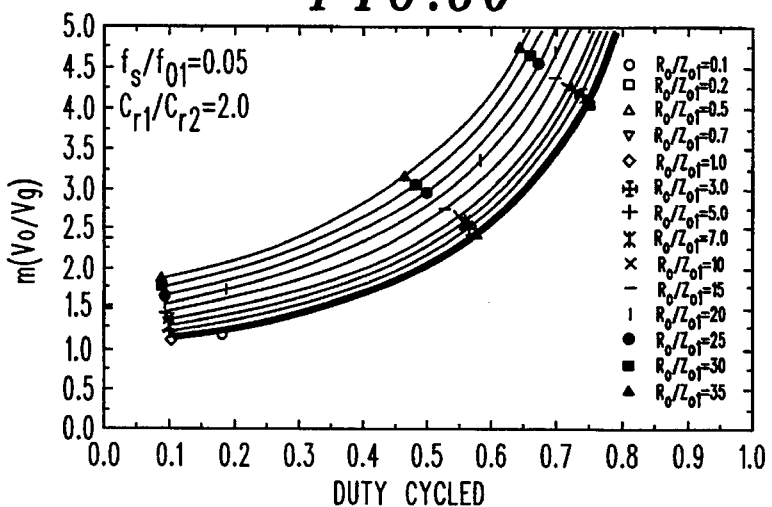

The steady-state performance of the Boost converter using the novel ZVS resonant switching bridge cell is shown in the state-plane diagrams of FIGS. 32–35. Curves of the converter voltage gain ($V_o/V_g$) versus equivalent duty cycle of switch $S_3$ are shown in FIGS. 58–60. Note that $C_1/C_2=2.0$, but $f_s/f_{o1}=0.1$, 0.2, and 0.05 for the respective figures. The exemplary Boost converter of one embodiment of the instant invention is based on the following specifications:

Input Voltage: $V_g=90-140$ V
Output Voltage: $V_o=200$ V
Output Power: $P_o=350-50$ W
Switching Frequency: 400 kHz The minimum and maximum converter voltage gain may thus be calculated: $m=V_o/V_g=1.42-2.23$. The output load will then vary from $R_o=114-800$ $\Omega$. The maximum to minimum load ratio will equal 800/1147. Referring to the converter voltage gain curves of FIGS. 58–60, we investigate the ability of the converter to operate both over a voltage gain of 1.42–2.23 and a load ratio of 7. It is desirable to maximize $f_s/f_{o1}$ since $f_{o1}$ is limited by the parasitic capacitance on the semiconductor switches and diodes.

It is also desirable to minimize the normalized load $Q_r=R_o/Z_{o1}$ since the circulating currents in the converter are related to $V_o/Z_{o1}$. If $f_s/f_{o1}=0.1$ is chosen, then over the gain specified, $Q_r$ may range from 0.1 to 10. Choosing $Q_r(min)=0.1$ is desirable, however this will lead to an extremely small value of $C_1$. It is therefor more advisable to determine the minimum achievable value of $C_1$ based upon the components to be used. $C_1$ should be greater or equal to $C_2$, $C_2=C_{DS}(T_2)+C_{DS}(T_3)$. At 200 Volts output, and $T_2$=MTP2N25 & $T_3$=MTP10N25, $C_2$ may be approximated as 350 pF. $\omega_{o1}=2f_{o1}=2f_s/f_{sn}$25.1 MRad/Sec. $Z_{o1}=1/(C_1 \omega_{o1})$ and if we choose $C_1=C_2$ then $Z_{o1}=159.2$ $\Omega$ The normalized load range may now be calculated knowing $Z_{o1}$ and $R_o$: $Q_r=0.7-5.0$. However, since the converter may achieve a maximum normalized load of 10, we set the range as $Q_r=0.7$ to $10.0=R_o/Z_{o1}=114/159$ to 1592/159. Therefor the circulating current will equal $V_o/Z_{o1}=1.26$ A, and the minimum power level for achieving ZVS will be $(200 V)^2/1592=25$ W. This is a lower minimum power level than required. The equivalent duty cycle of the main switch $S_3$ ranges from 0.05–0.55. $L_r$ may be calculated as $Z_{o1}/\omega_{o1}=6.3$ $\mu$H.

It is purposefully contemplated that the teachings of the present invention as hereinabove described not be limited to the described embodiments, as one of ordinary skill in the art will appreciate and can ascertain from the above disclosure in combination with the following claims.

What is claimed is:

1. A constant frequency controlled, zero-voltage switched, quasi-resonant converter for receiving power from a DC power source and providing power to a DC load, said converter comprising:

switching bridge means for connecting and disconnecting said power from said DC power source to and from said DC load, said switching bridge comprising:

(a) a resonant inductor having a first end operatively connected to a first node and a second end operatively connected to a second node;

(b) a first diode having an anode operatively connected to said first node and a cathode operatively connected to a third node;

(c) a second diode having an anode operatively connected to said second node and a cathode operatively connected to said third node;

(d) a third diode having an anode operatively connected to a fourth node and a cathode operatively connected to said second node;

(e) a fourth diode having an anode operatively connected to said fourth node and a cathode operatively connected to said first node;

(f) first and second active switch means for connecting and disconnecting said DC power source to and from said DC load, said first active switch means operatively connected across said second diode, said second switch means operatively connected across said third diode;

(g) a first resonant capacitor;

(h) a second resonant capacitor;

wherein said first resonant capacitor is operatively connected to said first node such that any voltage change across said first resonant capacitor necessitates a substantially equal voltage change across said fourth diode as represented by $$\frac{d}{dt} V \text{ first resonant capacitor} = \frac{d}{dt} V \text{ fourth diode}$$

and wherein said second capacitor is operatively connected to said second node such that any voltage change across said second resonant capacitor necessitates a substantially equal voltage change across said third diode as represented by $$\frac{d}{dt} V \text{ second resonant capacitor} = \frac{d}{dt} V \text{ third diode}$$

when said switching bridge is operatively connected to said converter such that any voltage change across said fourth diode necessitates a substantially equal and opposite voltage change across said first diode;

at least one filtering inductor having first and second ends, said first end operatively connected to said first node, said second end operatively connected to said DC power source;

at least one filtering capacitor having a first terminal and a second terminal, the first terminal coupled to said third node and the second terminal coupled to said fourth node;

a timing means for controlling a conduction interval for each of said first active switch means and said second active switch means so that said second active switch means conducts current for a percentage D of a switching period $T_S$, and said first active switch means conducts current only when said second active switch means is turned off such that said first active switch means and said second active switch means and said first diode and said fourth diode turn on and turn off with substantially zero volts across them.

2. The converter of claim 1 wherein said switching bridge further comprises third active switch means for connecting and disconnecting said power source to and from said load, said third active switch means operatively connected across said fourth diode, such that current conduction through said third active switch means while said first active switch means conducts current assures the turn-on of said second active switch means with substantially zero volts.

3. The converter of claim 3 wherein said switching bridge means further comprises fourth active switch means operatively connected across said first diode such that current conduction through said fourth active switch means while said second active switch means conducts current assures the turn-on of said first active switch means with substantially zero volts.

4. The converter of claim 3 wherein at least one of said first, second, third, and fourth active switch means comprises semiconductor means.

5. The converter of claim 1 wherein at least one of said first and second active switch means comprises semiconductor means.

6. The converter of claim 2 wherein at least one of said first, second and third active switch means comprises semiconductor means.

* * * * *